(12) United States Patent
Tacconi

(10) Patent No.: US 12,301,315 B1
(45) Date of Patent: May 13, 2025

(54) METHODS AND SYSTEMS FOR DETECTING, MEASURING, AND/OR LOCATING PASSIVE INTERMODULATION SOURCES VIA DOWNLINK (DL) SIGNAL INJECTION

(71) Applicant: ISCO International, LLC, Schaumburg, IL (US)

(72) Inventor: Pablo Tacconi, Arlington, TX (US)

(73) Assignee: ISCO International, LLC, Schaumburg, IL (US)

( * ) Notice: Subject to any disclaimer, the term of this patent is extended or adjusted under 35 U.S.C. 154(b) by 0 days.

(21) Appl. No.: 18/631,330

(22) Filed: Apr. 10, 2024

Related U.S. Application Data

(60) Provisional application No. 63/615,898, filed on Dec. 29, 2023.

(51) Int. Cl.
 *H04B 7/0426* (2017.01)
 *H04B 7/06* (2006.01)
 *H04B 17/345* (2015.01)
 *H04W 16/28* (2009.01)

(52) U.S. Cl.
 CPC ........... *H04B 7/043* (2013.01); *H04B 7/0617* (2013.01); *H04B 17/345* (2015.01); *H04W 16/28* (2013.01)

(58) Field of Classification Search
 CPC .... H04B 7/043; H04B 7/0617; H04B 17/345; H04W 16/28
 USPC ........................................................ 375/262
 See application file for complete search history.

(56) References Cited

U.S. PATENT DOCUMENTS

| | | | |
|---|---|---|---|
| 2,605,413 | A | 7/1952 | Alvarez |
| 2,978,702 | A | 4/1961 | Pakan |
| 3,093,824 | A | 6/1963 | Ammerman |
| 3,656,166 | A | 4/1972 | Klopach et al. |
| 3,718,935 | A | 2/1973 | Ranghelli et al. |
| 3,827,051 | A | 7/1974 | Foldes |
| 4,222,017 | A | 9/1980 | Foldes |
| 4,434,426 | A | 2/1984 | Gaglione et al. |
| 4,723,321 | A | 2/1988 | Saleh |

(Continued)

FOREIGN PATENT DOCUMENTS

| | | |
|---|---|---|
| CN | 1864302 A | 11/2006 |
| CN | 101291166 A | 10/2008 |

(Continued)

OTHER PUBLICATIONS

International Search Report & Written Opinion for PCT/2023/076690 mailed Nov. 17, 2023, 4 pp.

(Continued)

*Primary Examiner* — Fitwi Y Hailegiorgis
(74) *Attorney, Agent, or Firm* — Guntin & Gust, PLC; John G. Rauch

(57) ABSTRACT

Aspects of the subject disclosure may include, for example, modifying one or more signals in a downlink (DL) transmit path of a base station, resulting in one or more modified signals, causing one or more radio frequency (RF) signals corresponding to the one or more modified signals to be transmitted by the base station, and responsive to transmission of the one or more RF signals, monitoring uplink (UL) signals received by the base station to detect interference that originates from one or more passive intermodulation (PIM) sources. Other embodiments are disclosed.

20 Claims, 23 Drawing Sheets

(56) References Cited

U.S. PATENT DOCUMENTS

| | | |
|---|---|---|
| 5,015,053 A | 5/1991 | Johnson |
| 5,068,667 A | 11/1991 | Mizoguchi |
| 5,929,820 A | 7/1999 | Caulfield et al. |
| 5,940,044 A | 8/1999 | Smith |
| 6,072,439 A | 6/2000 | Ippolito et al. |
| 6,111,542 A | 8/2000 | Day et al. |
| 6,201,801 B1 | 3/2001 | Dent |
| 6,310,585 B1 | 10/2001 | Marino |
| 6,380,903 B1 | 4/2002 | Hayes et al. |
| 6,621,465 B2 | 9/2003 | Teillet et al. |
| 6,631,277 B2 | 10/2003 | Berg et al. |
| 6,703,974 B2 | 3/2004 | White et al. |
| 6,704,557 B1 | 3/2004 | Krishnamurthy et al. |
| 6,717,555 B2 | 4/2004 | Teillet et al. |
| 6,801,160 B2 | 10/2004 | Henderson et al. |
| 6,801,790 B2 | 10/2004 | Rudrapatna |
| 6,960,650 B2 | 11/2005 | Pulst et al. |
| 6,998,908 B1 | 2/2006 | Sternowski |
| 7,023,398 B2 | 4/2006 | Gottl et al. |
| 7,123,194 B2 | 10/2006 | Park et al. |
| 7,196,674 B2 | 3/2007 | Timofeev et al. |
| 7,346,134 B2 | 3/2008 | Smith |
| 7,365,695 B2 | 4/2008 | Thomas et al. |
| 7,729,431 B2 | 6/2010 | Gebara et al. |
| 7,733,288 B2 | 6/2010 | Williams |
| 7,773,967 B2 | 8/2010 | Smith |
| 8,023,984 B2 | 9/2011 | Jin et al. |
| 8,072,384 B2 | 12/2011 | Morrow |
| 8,134,511 B2 | 3/2012 | Koh et al. |
| 8,238,318 B1 | 8/2012 | Negus |
| 8,289,218 B2 | 10/2012 | Payne |
| 8,903,324 B1 | 12/2014 | Bradley |
| 8,923,381 B2 | 12/2014 | Rilling |
| 8,934,457 B2 | 1/2015 | Kapoor et al. |
| 8,954,023 B2 | 2/2015 | Hillstrom et al. |
| 8,976,072 B2 | 3/2015 | Lenormand et al. |
| 9,136,932 B2 | 9/2015 | Asplund et al. |
| 9,219,508 B1 | 12/2015 | Veysoglu et al. |
| 9,252,865 B2 | 2/2016 | Rilling |
| 9,271,185 B2 | 2/2016 | Abdelmonem et al. |
| 9,313,680 B2 | 4/2016 | Galeev et al. |
| 9,461,681 B1 | 10/2016 | Kato et al. |
| 9,472,852 B2 | 10/2016 | Oshea et al. |
| 9,531,482 B2 | 12/2016 | Sobczak et al. |
| 9,548,775 B2 | 1/2017 | Smith |
| 9,571,176 B2 | 2/2017 | Desclos et al. |
| 9,590,313 B2 | 3/2017 | Jan et al. |
| 9,654,158 B2 | 5/2017 | Dafesh et al. |
| 9,712,259 B2 | 7/2017 | Sobczak et al. |
| 9,716,541 B2 | 7/2017 | Sanderovich et al. |
| 9,762,297 B2 | 9/2017 | Lee et al. |
| 9,800,355 B1 | 10/2017 | Lee et al. |
| 9,806,413 B1 | 10/2017 | Chukka et al. |
| 9,847,571 B2 | 12/2017 | Bit-Babik et al. |
| 9,887,467 B2 | 2/2018 | Aryanfar |
| 9,887,716 B2 | 2/2018 | Alavi et al. |
| 9,887,717 B2 | 2/2018 | Cyzs et al. |
| 9,923,598 B2 | 3/2018 | Dafesh et al. |
| 9,929,886 B2 | 3/2018 | Amadjikpe et al. |
| 9,941,959 B2 | 4/2018 | Heath et al. |
| 9,960,500 B2 | 5/2018 | Song et al. |
| 9,972,918 B2 | 5/2018 | Lin et al. |
| 9,986,512 B2 | 5/2018 | Abdelmonem et al. |
| 9,998,158 B2 | 6/2018 | Smith |
| 10,027,036 B2 | 7/2018 | Schmidt et al. |
| 10,056,675 B1 | 8/2018 | Dybdal |
| 10,116,048 B2 | 10/2018 | Mielke et al. |
| 10,234,514 B2 | 3/2019 | Leese De Escobar et al. |
| 10,237,765 B1 | 3/2019 | Bradley |
| 10,454,185 B1 | 10/2019 | Moran et al. |
| 10,468,781 B1 | 11/2019 | Paulsen et al. |
| 10,530,033 B2 | 1/2020 | Moriguchi |
| 10,530,440 B2 | 1/2020 | Bisiules et al. |
| 10,581,163 B2 | 3/2020 | Schmutzler et al. |
| 10,608,859 B2 | 3/2020 | Matitsine et al. |
| 10,652,835 B2 | 5/2020 | Tacconi et al. |
| 10,727,885 B2 | 7/2020 | Smith |
| 10,777,894 B2 | 9/2020 | McMichael |
| 10,862,518 B1 | 12/2020 | Labadie et al. |
| 10,868,350 B2 | 12/2020 | Oppenlaender et al. |
| 10,868,609 B1 | 12/2020 | Kossin et al. |
| 10,958,312 B2 | 3/2021 | Pollman et al. |
| 10,971,815 B1 | 4/2021 | West et al. |
| 11,025,472 B2 | 6/2021 | Matitsine et al. |
| 11,038,549 B1 | 6/2021 | Harley et al. |
| 11,121,816 B2 | 9/2021 | Wang et al. |
| 11,145,971 B1 | 10/2021 | Cripe |
| 11,158,956 B2 | 10/2021 | Le |
| 11,177,582 B2 | 11/2021 | Seo |
| 11,239,886 B2 | 2/2022 | Pollman et al. |
| 11,265,032 B2 | 3/2022 | Smith |
| 11,289,799 B2 | 3/2022 | Everest et al. |
| 11,296,429 B2 | 4/2022 | Biancotto et al. |
| 11,316,258 B2 | 4/2022 | Junttila |
| 11,329,387 B2 | 5/2022 | Da Silveira et al. |
| 11,336,028 B2 | 5/2022 | Shen et al. |
| 11,342,668 B2 | 5/2022 | Chen et al. |
| 11,349,530 B2 | 5/2022 | Frenger et al. |
| 11,349,581 B1 | 5/2022 | Dybdal et al. |
| 11,360,396 B2 | 6/2022 | Bauerschmidt et al. |
| 11,363,678 B2 | 6/2022 | Rosenschild et al. |
| 11,411,323 B2 | 8/2022 | Wu et al. |
| 11,437,701 B2 | 9/2022 | Rai et al. |
| 11,451,274 B2 | 9/2022 | El-Keyi et al. |
| 11,509,071 B1 | 11/2022 | Abdelmonem et al. |
| 11,509,072 B1 | 11/2022 | Abdelmonem et al. |
| 11,515,652 B1 | 11/2022 | Abdelmonem et al. |
| 11,594,821 B1 | 2/2023 | Abdelmonem et al. |
| 11,600,920 B2 | 3/2023 | Udagave |
| 11,626,667 B1 | 4/2023 | Abdelmonem et al. |
| 11,670,847 B1 | 6/2023 | Abdelmonem et al. |
| 11,705,940 B2 | 7/2023 | Abdelmonem et al. |
| 11,811,127 B2 | 11/2023 | Lysejko et al. |
| 11,838,039 B2 | 12/2023 | Smith |
| 11,956,027 B2 | 4/2024 | Abdelmonem et al. |
| 12,057,895 B2 | 8/2024 | Abdelmonem et al. |
| 2002/0193071 A1 | 12/2002 | Waltho |
| 2003/0162566 A1 | 8/2003 | Shapira et al. |
| 2004/0082335 A1 | 4/2004 | Hirayama et al. |
| 2004/0106436 A1 | 6/2004 | Ochi et al. |
| 2005/0226353 A1 | 10/2005 | Gebara et al. |
| 2005/0239403 A1 | 10/2005 | Karabinis |
| 2006/0014491 A1 | 1/2006 | Cleveland et al. |
| 2006/0202906 A1 | 9/2006 | Okubo et al. |
| 2007/0020224 A1 | 1/2007 | Vetter et al. |
| 2007/0046558 A1 | 3/2007 | Tillery |
| 2007/0060059 A1 | 3/2007 | Kim et al. |
| 2007/0080868 A1 | 4/2007 | Hwang et al. |
| 2007/0205955 A1 | 9/2007 | Korisch et al. |
| 2008/0062062 A1 | 3/2008 | Borau et al. |
| 2008/0150799 A1 | 6/2008 | Hemmi et al. |
| 2008/0253308 A1 | 10/2008 | Ward et al. |
| 2008/0280571 A1 | 11/2008 | Rofougaran et al. |
| 2009/0040127 A1 | 2/2009 | Williams |
| 2009/0189820 A1 | 7/2009 | Saito et al. |
| 2009/0224995 A1 | 9/2009 | Puente et al. |
| 2010/0304680 A1 | 12/2010 | Kuffner et al. |
| 2010/0311353 A1 | 12/2010 | Rabinovich et al. |
| 2011/0057849 A1 | 3/2011 | Naym et al. |
| 2011/0059694 A1 | 3/2011 | Audic |
| 2011/0069633 A1 | 3/2011 | Schmidt et al. |
| 2011/0096812 A1 | 4/2011 | Hahm et al. |
| 2011/0116569 A1 | 5/2011 | Vaughan et al. |
| 2011/0134001 A1 | 6/2011 | Sakata et al. |
| 2011/0150118 A1 | 6/2011 | Asplund et al. |
| 2011/0158081 A1 | 6/2011 | Wang et al. |
| 2011/0171922 A1 | 7/2011 | Kim et al. |
| 2012/0009964 A1 | 1/2012 | Gormley et al. |
| 2012/0063529 A1 | 3/2012 | Choi et al. |
| 2012/0108178 A1 | 5/2012 | Lee et al. |
| 2012/0188137 A1 | 7/2012 | Lalezari |
| 2012/0229232 A1 | 9/2012 | Mahon et al. |
| 2013/0044650 A1 | 2/2013 | Barker et al. |
| 2013/0157601 A1 | 6/2013 | O'Keeffee et al. |

(56) References Cited

U.S. PATENT DOCUMENTS

| | | |
|---|---|---|
| 2013/0331039 A1 | 12/2013 | Hillstrom et al. |
| 2014/0022125 A1 | 1/2014 | Zhu et al. |
| 2014/0035698 A1 | 2/2014 | Schadler et al. |
| 2014/0035792 A1 | 2/2014 | Schadler et al. |
| 2014/0097987 A1 | 4/2014 | Worl et al. |
| 2014/0191924 A1 | 7/2014 | Payne et al. |
| 2014/0236546 A1 | 8/2014 | Payne |
| 2014/0274094 A1 | 9/2014 | Abdelmonem et al. |
| 2015/0015372 A1 | 1/2015 | Hara et al. |
| 2015/0091755 A1 | 4/2015 | Chawgo |
| 2015/0092621 A1 | 4/2015 | Jalloul et al. |
| 2015/0108210 A1 | 4/2015 | Zhou |
| 2015/0116153 A1 | 4/2015 | Chen et al. |
| 2015/0156642 A1 | 6/2015 | Sobczak et al. |
| 2015/0162658 A1 | 6/2015 | Bowers et al. |
| 2015/0195001 A1 | 7/2015 | Barker et al. |
| 2015/0200709 A1 | 7/2015 | Negus et al. |
| 2015/0264584 A1 | 9/2015 | Dayanandan et al. |
| 2015/0340875 A1 | 11/2015 | Prasad |
| 2015/0351103 A1 | 12/2015 | Kim et al. |
| 2016/0036505 A1 | 2/2016 | George et al. |
| 2016/0087348 A1 | 3/2016 | Ko et al. |
| 2016/0088572 A1 | 3/2016 | Bl et al. |
| 2016/0105255 A1 | 4/2016 | Henry et al. |
| 2016/0112111 A1 | 4/2016 | Bull |
| 2016/0126633 A1 | 5/2016 | Keller et al. |
| 2016/0142229 A1 | 5/2016 | Bevan et al. |
| 2016/0233944 A1 | 8/2016 | Mswanathan |
| 2016/0254595 A1 | 9/2016 | Sobczak et al. |
| 2016/0276725 A1 | 9/2016 | Barnickel et al. |
| 2016/0366605 A1* | 12/2016 | Tsui ..................... H04W 24/08 |
| 2016/0380690 A1 | 12/2016 | Jidhage |
| 2017/0063410 A1 | 3/2017 | Cyzs et al. |
| 2017/0077612 A1 | 3/2017 | Aryanfar |
| 2017/0077616 A1 | 3/2017 | Corum et al. |
| 2017/0085398 A1 | 3/2017 | Liu |
| 2017/0093048 A1 | 3/2017 | Chen et al. |
| 2017/0156119 A1 | 6/2017 | Neves et al. |
| 2017/0194704 A1 | 7/2017 | Chawgo et al. |
| 2017/0237484 A1 | 8/2017 | Heath et al. |
| 2017/0245162 A1* | 8/2017 | Beck ..................... H04L 43/50 |
| 2017/0250765 A1 | 8/2017 | Hasarchi et al. |
| 2017/0353929 A1 | 12/2017 | Tacconi et al. |
| 2018/0034164 A1 | 2/2018 | Jang et al. |
| 2018/0041270 A1 | 2/2018 | Buer et al. |
| 2018/0083368 A1 | 3/2018 | Teillet et al. |
| 2018/0167148 A1 | 6/2018 | Vannucci et al. |
| 2018/0176802 A1 | 6/2018 | Rosenhouse et al. |
| 2018/0219636 A1 | 8/2018 | Gale et al. |
| 2019/0007078 A1 | 1/2019 | Tsui et al. |
| 2019/0052294 A1 | 2/2019 | Abdelmonem |
| 2019/0052381 A1 | 2/2019 | Abdelmonem |
| 2019/0058534 A1 | 2/2019 | Anderson |
| 2019/0074864 A1 | 3/2019 | Henry et al. |
| 2019/0074865 A1 | 3/2019 | Henry et al. |
| 2019/0103309 A1 | 4/2019 | Lin |
| 2019/0103909 A1 | 4/2019 | Bengtsson et al. |
| 2019/0165822 A1 | 5/2019 | Chen |
| 2019/0212699 A1 | 7/2019 | Waldern et al. |
| 2019/0222329 A1 | 7/2019 | Abdelmonem |
| 2019/0252801 A1 | 8/2019 | Mahanfar et al. |
| 2019/0273315 A1 | 9/2019 | Hu et al. |
| 2019/0273326 A1 | 9/2019 | Sanford et al. |
| 2019/0334636 A1 | 10/2019 | Li et al. |
| 2019/0372237 A1 | 12/2019 | Yman et al. |
| 2019/0386759 A1 | 12/2019 | Singh et al. |
| 2019/0393598 A1 | 12/2019 | Logothetis et al. |
| 2020/0052388 A1 | 2/2020 | Jang et al. |
| 2020/0136247 A1 | 4/2020 | Al et al. |
| 2020/0145032 A1 | 5/2020 | Ayala et al. |
| 2020/0185825 A1 | 6/2020 | Palud |
| 2020/0187213 A1 | 6/2020 | Yun et al. |
| 2020/0236630 A1 | 7/2020 | Tacconi et al. |
| 2020/0288418 A1 | 9/2020 | Åström et al. |
| 2020/0321697 A1 | 10/2020 | Zimmerman et al. |
| 2020/0373663 A1 | 11/2020 | Xu |
| 2021/0028829 A1 | 1/2021 | Rios |
| 2021/0098896 A1 | 4/2021 | Wang et al. |
| 2021/0127284 A1 | 4/2021 | Abdelmonem et al. |
| 2021/0175622 A1 | 6/2021 | Jing et al. |
| 2021/0185692 A1 | 6/2021 | Stephenne et al. |
| 2021/0226315 A1 | 7/2021 | Liu |
| 2021/0227400 A1 | 7/2021 | Jia |
| 2021/0297141 A1 | 9/2021 | Schafer et al. |
| 2021/0320413 A1 | 10/2021 | Wu et al. |
| 2021/0344122 A1 | 11/2021 | Kaistha et al. |
| 2021/0359406 A1 | 11/2021 | Yang et al. |
| 2022/0006167 A1 | 1/2022 | P |
| 2022/0037753 A1 | 2/2022 | Tang et al. |
| 2022/0043104 A1 | 2/2022 | El Assaad |
| 2022/0069463 A1 | 3/2022 | Abdelmonem et al. |
| 2022/0069853 A1 | 3/2022 | Abdelmonem et al. |
| 2022/0069855 A1 | 3/2022 | Abdelmonem et al. |
| 2022/0069865 A1 | 3/2022 | Abdelmonem et al. |
| 2022/0069897 A1 | 3/2022 | Abdelmonem et al. |
| 2022/0069898 A1 | 3/2022 | Abdelmonem et al. |
| 2022/0069927 A1 | 3/2022 | Abdelmonem et al. |
| 2022/0109977 A1 | 4/2022 | Zander et al. |
| 2022/0123821 A1 | 4/2022 | Sakhnini et al. |
| 2022/0131269 A1 | 4/2022 | Choi et al. |
| 2022/0149921 A1 | 5/2022 | Nilsson et al. |
| 2022/0200139 A1 | 6/2022 | Ryu et al. |
| 2022/0209428 A1 | 6/2022 | Raghavan et al. |
| 2022/0279520 A1 | 9/2022 | Tsui et al. |
| 2022/0279535 A1 | 9/2022 | Tsui |
| 2022/0311477 A1 | 9/2022 | Sun et al. |
| 2022/0320756 A1 | 10/2022 | Hassan et al. |
| 2022/0321241 A1 | 10/2022 | Bennett et al. |
| 2022/0322321 A1 | 10/2022 | Dai et al. |
| 2022/0352942 A1 | 11/2022 | Kalantari et al. |
| 2022/0365224 A1 | 11/2022 | Rose et al. |
| 2023/0179252 A1 | 6/2023 | Ellgardt et al. |
| 2023/0198141 A1 | 6/2023 | Chien et al. |
| 2023/0318174 A1 | 10/2023 | Abdelmonem et al. |
| 2023/0318175 A1 | 10/2023 | Abdelmonem et al. |
| 2023/0318197 A1 | 10/2023 | Abdelmonem et al. |
| 2023/0318198 A1 | 10/2023 | Abdelmonem et al. |
| 2023/0327708 A1 | 10/2023 | Abdelmonem et al. |
| 2023/0387605 A1 | 11/2023 | Abdelmonem et al. |
| 2023/0387606 A1 | 11/2023 | Abdelmonem et al. |
| 2023/0387608 A1 | 11/2023 | Abdelmonem et al. |
| 2024/0014883 A1 | 1/2024 | Schmidt et al. |
| 2024/0047891 A1 | 2/2024 | Abdelmonem et al. |
| 2024/0055777 A1 | 2/2024 | Abdelmonem et al. |
| 2024/0113443 A1 | 4/2024 | Abdelmonem et al. |
| 2024/0113745 A1 | 4/2024 | Abdelmonem et al. |
| 2024/0129016 A1 | 4/2024 | Abdelmonem |
| 2024/0129945 A1 | 4/2024 | Abdelmonem |
| 2024/0137103 A1 | 4/2024 | Abdelmonem |
| 2024/0137104 A1 | 4/2024 | Abdelmonem |
| 2024/0178926 A1 | 5/2024 | Zaki et al. |
| 2024/0195059 A1 | 6/2024 | Abdelmonem et al. |
| 2024/0204857 A1 | 6/2024 | Abdelmonem |
| 2024/0214032 A1 | 6/2024 | Abdelmonem et al. |
| 2024/0214054 A1 | 6/2024 | Abdelmonem |
| 2024/0267110 A1 | 8/2024 | Abdelmonem |
| 2024/0322862 A1 | 9/2024 | Abdelmonem et al. |

FOREIGN PATENT DOCUMENTS

| | | |
|---|---|---|
| CN | 202523820 U | 11/2012 |
| CN | 108631055 A | 10/2018 |
| CN | 209910515 U | 1/2020 |
| CN | 209963261 U | 1/2020 |
| CN | 112103653 A | 12/2020 |
| CN | 213637748 U | 7/2021 |
| CN | 113451764 A | 9/2021 |
| CN | 113922101 A | 1/2022 |
| WO | 2009072037 A2 | 6/2009 |

(56) References Cited

FOREIGN PATENT DOCUMENTS

| | | |
|---|---|---|
| WO | 2009120237 A1 | 10/2009 |
| WO | 2020064914 A1 | 4/2020 |

OTHER PUBLICATIONS

International Search Report and Written Opinion for PCT/US2023/076674, mailed Nov. 17, 2023, 3 pp.
Amendment Under Article 34 / Response to Written Opinion for PCT/US23/15540 filed Jan. 26, 2024., 11 pp
International Search Report & Written Opinion for PCT/US2023/015540 mailed Jun. 14, 2023, 15 pp.
Amendment Under Article 34/Response to Written Opinion for PCT/US2021/046881 filed Jun. 16, 2022, 16 pages.
Amendment Under Article 34 / Response to Written Opinion filed for PCT/US2021/046807 on Jun. 15, 2022, 19 pages.
PCT/US2021/046804, Amendment under Article 34 and response to Written Opinion, filed May 31, 2022, 19 pages.
PCT/US2021/046804, International Preliminary Report on Patentability, mailed Sep. 13, 2022, 31 pages.
"Amendment Under Article 34 / Response to Written Opinion", for application No. PCT/US2021/046806, Feb. 8, 2022, 8 pages.
"Amendment Under Article 34 / Response to Written Opinion", PCT/US2023/015534, Jan. 26, 2024, 7 pages.
"Examination Report for India Application No. 202347019825", Sep. 12, 2023, 7 Pages.
"International Preliminary Report", for Application PCT/US2021/046805, Mar. 9, 2023, 9 pgs.
"International Preliminary Report on Patentability", For Application PCT/US2021/046807, Aug. 20, 2021, 28 Pages.
"International Preliminary Report on Patentability", for Application No. PCT/US2021/46881, Feb. 17, 2023, 25.
"International Preliminary Report on Patentability", PCT/US2021/046872, May 4, 2022, 12 pgs.
"International Search Report and Written Opinion", for Application No. PCT/US2021/046875, Nov. 23, 2021, 10 pages.
"International Search Report and Written Opinion", for Application No. PCT/US2021/046872, Nov. 23, 2021, 13 pages.
"International Search Report and Written Opinion", for Application No. PCT/US2021/46805, Nov. 8, 2021, 15 pages.
"International Search Report and Written Opinion", for Application No. PCT/US2021/46881, Dec. 3, 2021, 12 pages.
"International Search Report and Written Opinion", for Application No. PCT/US2021/046804, Dec. 3, 2021, 14 pages.
"International Search Report and Written Opinion", For Application No. PCT/US2021/046807, Dec. 3, 2021, 15 pages.
"International Search Report and Written Opinion", PCT/US2023/015534, Apr. 19, 2023, 7 pages.
"International Search Report and Written Opinion", for Application No. PCT/US2021/046806, Nov. 8, 2021, 9 pages.
"International Search Report and Written Opinion", Appln. No. PCT/US2023/023403, Sep. 15, 2023, 10 pages.
"International Search Report and Written Opinion for Application No. PCT/US2023/076650", Nov. 16, 2023, 7 pages.
"International Search Report and Written Opinion for PCT/US2023/023402", Sep. 15, 2023, 11 Pages.
"International Search Report and Written Opinion for PCT/US2023/023405", Sep. 18, 2023, 10 Pages.
"Notification of Transmittal of International Preliminary Report on PA Tentability", PCT/US2021/046875, May 2, 2022, 16 pages.
"Notification of Transmittal of International Preliminary Report on PA Tentability", PCT/US2021/046875, May 2, 2022, 16 pgs.
"Notification of Transmittal of International Preliminary Report on Patentability", PCT/US2021/046806 mailed May 4, 2022, May 4, 2022, 16 pages.
"Notification of Transmittal of the International Search Report and the Written OPL I'ION", PCT/US2023/076696, ISR/WO Mailed Jan. 25, 2024, Jan. 25, 2024, 7 pgs.
"PCT/US2021/046872—Article 34 Amendment", Feb. 10, 2022, 8 pgs.
"PCT/US2021/046875—Article 34 Amendments", Apr. 13, 2022, 8 pgs.
"PCT/US2023/015538", International Search Report, Mailed Apr. 17, 2023, Apr. 17, 2023, 6 pgs.
Clenet, M., et al., "Laminated Waveguide as Radiating Element for Array Applications", IEEE Transactions on Antennas and Propagation, vol. 54, No. 5, pp. 1481-1487, May 2006. (Year: 2006).
PCT/US2023/076674, Amendment Under Article 34, filed Aug. 13, 2024, 10 pages.
PCT/US2023/076650, Amendment Under Article 34, Filed Jul. 24, 2024, 12 pages.
International Preliminary Report on Patentability for PCT/US2023/015540 Mailed Jun. 12, 2024, 22 pp.
"Amendment Under Article 34/Response to Written Opinion for Application No. PCT/US2023/076696", Jul. 24, 2024, 6 pages.
Extended European Search Report for EP 21862420.3, mailed Oct. 1, 2024, 10 pp.
Extended European Search Report for EP21862418.7 mailed Nov. 27, 2024, 18 pp.
PCT/US2023/076674, International Preliminary Report on Patentability, mailed Oct. 28, 2024, 20 pages.
"European Search Report for 21862430.2, Oct. 1, 2024", 9 Pages.
"International Preliminary Report on Patentability", Appln. No. PCT/US2023/023403, Dec. 5, 2024, 5 pages.
"International Preliminary Report on Patentability received for PCT Application Serial No. PCT/US2023/023405", 4 Pages.
"Notification Concerning Transmittal of International Preliminary Report on Patentability (Chapter I of the Patent Cooperation Treaty)", PCT, From the International Bureau, 6 pages, 2024.
"PCT/US2023/015538 International Preliminary Report on Patentability", Oct. 10, 2024, 5.
"PCT/US2023/076696 International Preliminary Report on Patent Ability", Nov. 14, 2024, 10 pgs.

\* cited by examiner

320

340

METHODS AND SYSTEMS FOR DETECTING, MEASURING, AND/OR LOCATING PASSIVE INTERMODULATION SOURCES VIA DOWNLINK (DL) SIGNAL INJECTION

CROSS-REFERENCE TO RELATED APPLICATION

This application claims the benefit of and priority to U.S. Provisional Ser. No. 63/615,898, filed Dec. 29, 2023. The contents of the foregoing are hereby incorporated by reference into this application as if set forth herein in full.

FIELD OF THE DISCLOSURE

The subject disclosure relates to detecting, measuring, and/or locating passive intermodulation (PIM) sources via downlink (DL) signal injection.

BACKGROUND

Passive intermodulation interference, also known as PIM, occurs when one or more base stations transmit signals in two or more frequencies or carriers, where the transmitted signals mix non-linearly and produce intermodulation (IM) product(s) that impact the base station receiver(s). In modern 4G and 5G cellular systems, PIM can seriously degrade the base station receiver performance.

BRIEF DESCRIPTION OF THE DRAWINGS

Reference will now be made to the accompanying drawings, which are not necessarily drawn to scale, and wherein.

DETAILED DESCRIPTION

As used herein, the term "downlink" (DL) refers or relates to signals that are transmitted by the base station and received by a user equipment (UE) or mobile equipment. As used herein, the term "uplink" (UL) refers or relates to signals that are transmitted by the UE and received by the base station.

PIM is generated by the non-linear mixing of strong RF signals of different carrier frequencies. For the non-linear mixing to occur, the RF signals must be high power. Therefore, PIM is more likely to occur by the mixing of the downlink signals than uplink signals. In communication equipment, PIM becomes a problem when one or more of the intermodulation products generated lands in the receive carrier frequencies. PIM can severely degrade the performance of a receiver.

As used herein, the term "illuminate" (or "illumination") refers to the act of transmitting radio frequency (RF) energy in a particular direction, analogous to illumination using light, but with RF waves instead of light waves. As used herein in at least some contexts, "PIM analysis" and "PIM analyzer" refer to the process of measuring PIM while the source is being illuminated with signals (e.g., continuous wave (CW) signals) that are created for the purpose of facilitating the measurement. This may also be referred to herein as "controlled illumination." As used herein in at least some contexts, "PIM detection" refers to the process of measuring PIM while in the PIM source is illuminated with signals that are (e.g., normally) transmitted by the communications system as part of data communications. This may also be referred to herein as "uncontrolled illumination."

Figure 1A:
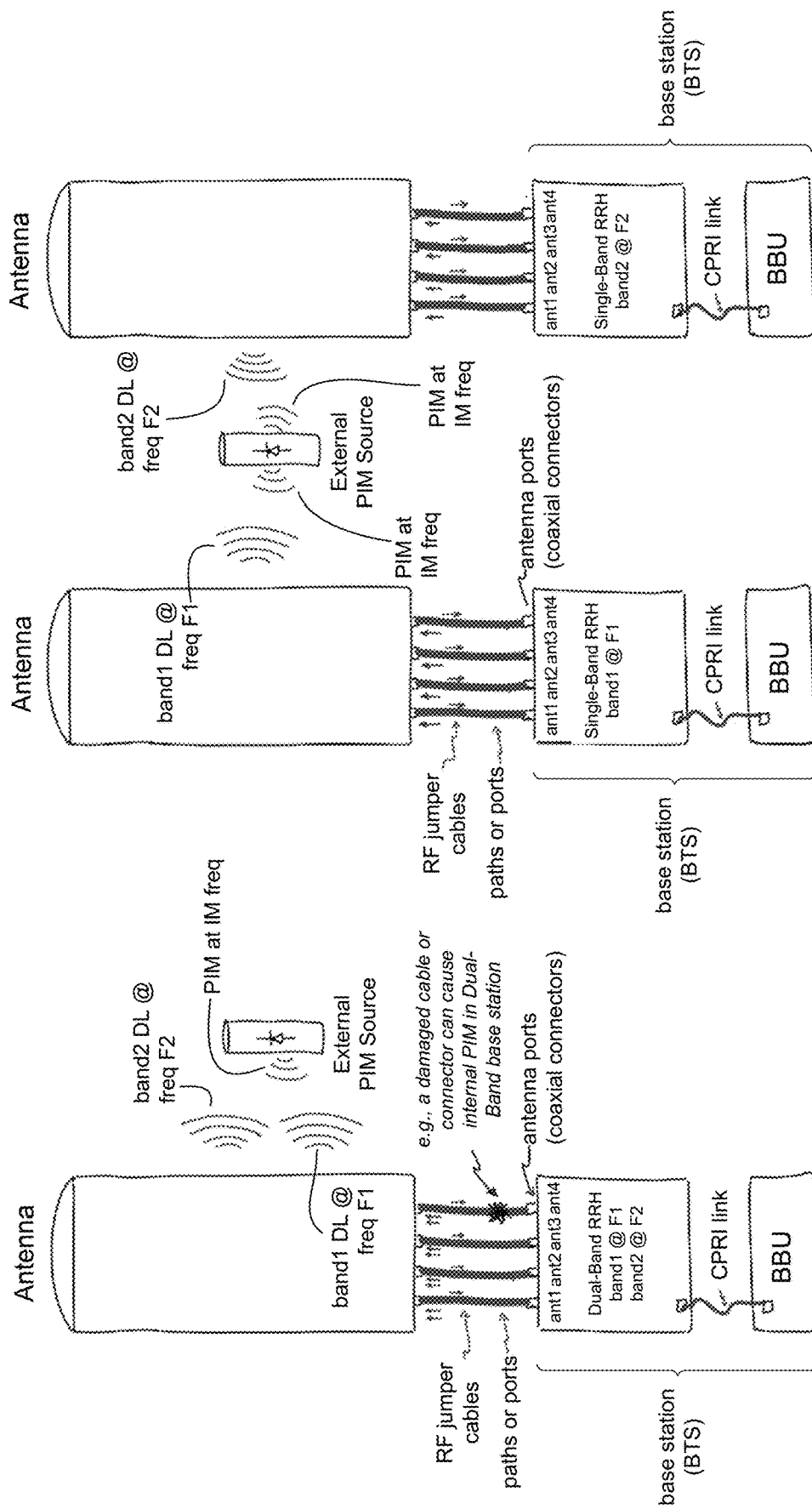
FIG. 1A illustrates example internal and external PIM in dual-band and single-band base stations.

PIM can be internal to the base station and its antenna system or external thereto. Internal PIM is caused by non-linearities in passive devices, such as filters, duplexers, connectors, cables, antennas, etc., within the transmit signal path of a multi-band or multi-carrier base station (PIM can be generated by the mixing of carriers in the same band, or carriers in different bands). The main problem with internal PIM is the mixing of the DL carriers within each path. Particularly, a given path may suffer from internal PIM due to the mixing of the DL carriers transmitted in that path. External PIM, on the other hand, is generated by an object that is external to the base station and its antenna system. Here, the DL carriers transmitted from different paths can mix to produce PIM. For instance, external PIM occurs when there is a non-linear metallic object (referred to as an external PIM source) in the vicinity of the antenna (typically within less than 10 feet) that is simultaneously exposed to radio frequency (RF) energy from two or more DL carriers transmitted by the base station(s) via their antenna(s). External PIM is quite common in base stations that are located on rooftops. Rooftops are often full of metallic objects, such as ducts, pipes, air-conditioners, vents, roof-flashing, masts, and communication equipment (e.g., other antennas). Any of these objects and structures can generate PIM. External PIM is less common in base stations that are located in cell towers since the antenna(s) on cell towers are generally pointed in outward directions and, therefore, there is typically only free space in front of the antenna(s). If external PIM is indeed present on a cell tower, it is most likely generated by the mounting hardware or some structure on the side or behind the antenna(s). In any case, both multi-band and single-band base stations are susceptible to external PIM. FIG. 1A illustrates example internal and external PIM in dual-band and single-band base stations.

It should be noted that PIM can be generated by the mixing of carriers in the same band, or carriers in different bands. Within the text and figures, the terms band and carrier are used interchangeably. The figures reference single-band, dual-band, and multi-band base stations, but it shall be understood that they also apply to single-carrier, dual-carrier, and multi-carrier base stations.

Today, it is very difficult and expensive to locate external sources of PIM on rooftops. When a cellular operator suspects external PIM, a technician team is often sent to the cell site. The team typically starts by inspecting the rooftop, and then proceeds to clean, repair, and/or remove any suspicious objects. This procedure is known as PIM hygiene, and includes replacing loose connections or damaged cables and removing corrosion or any metallic objects that might be in the vicinity of the antennas. However, PIM hygiene often fails to resolve PIM issues. Additional steps include using specific PIM test equipment to help locate PIM, such as a PIM analyzer.

Figure 1B:
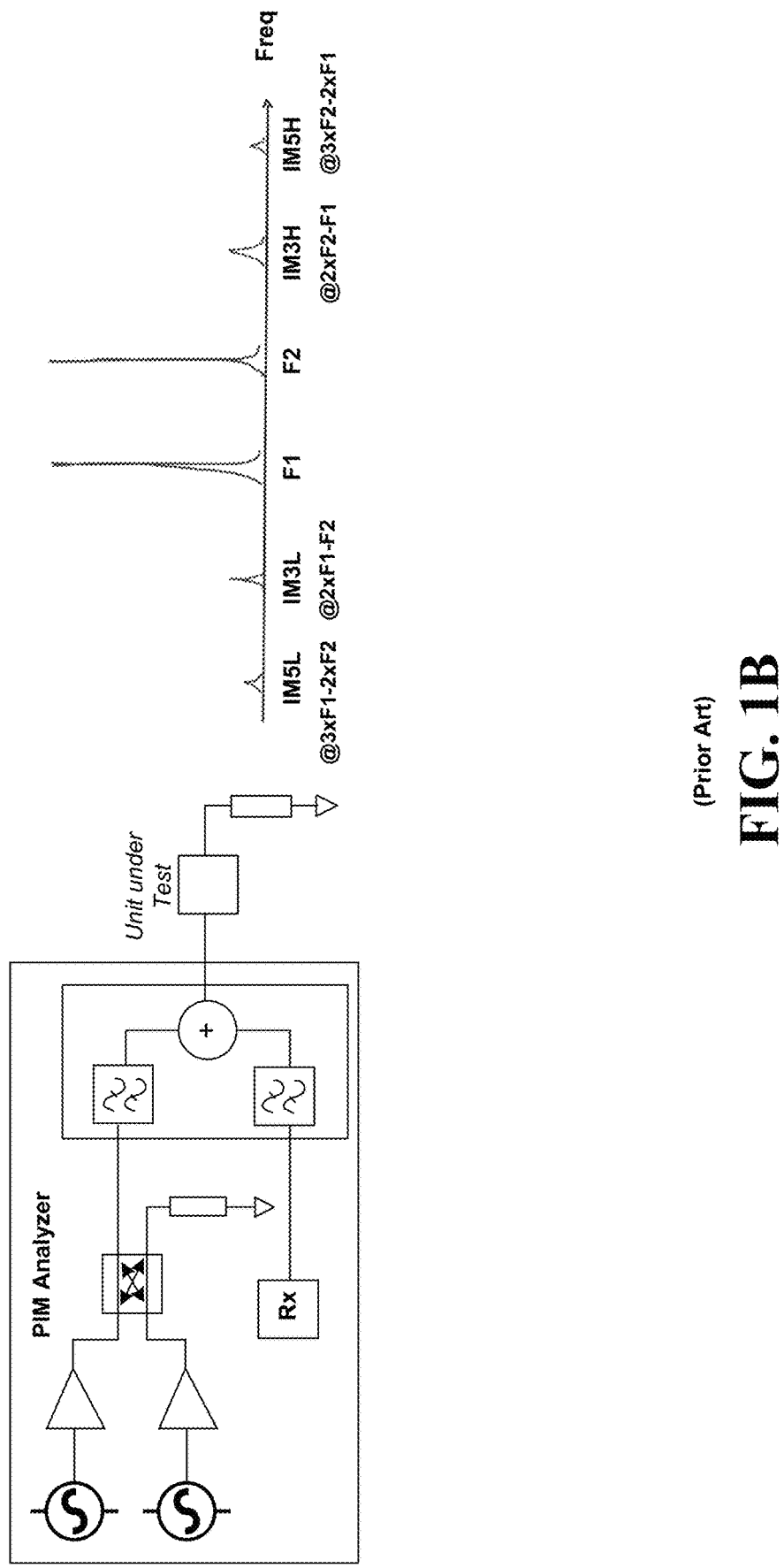
FIG. 1B is a block diagram of a conventional PIM analyzer.
Figure 1C:
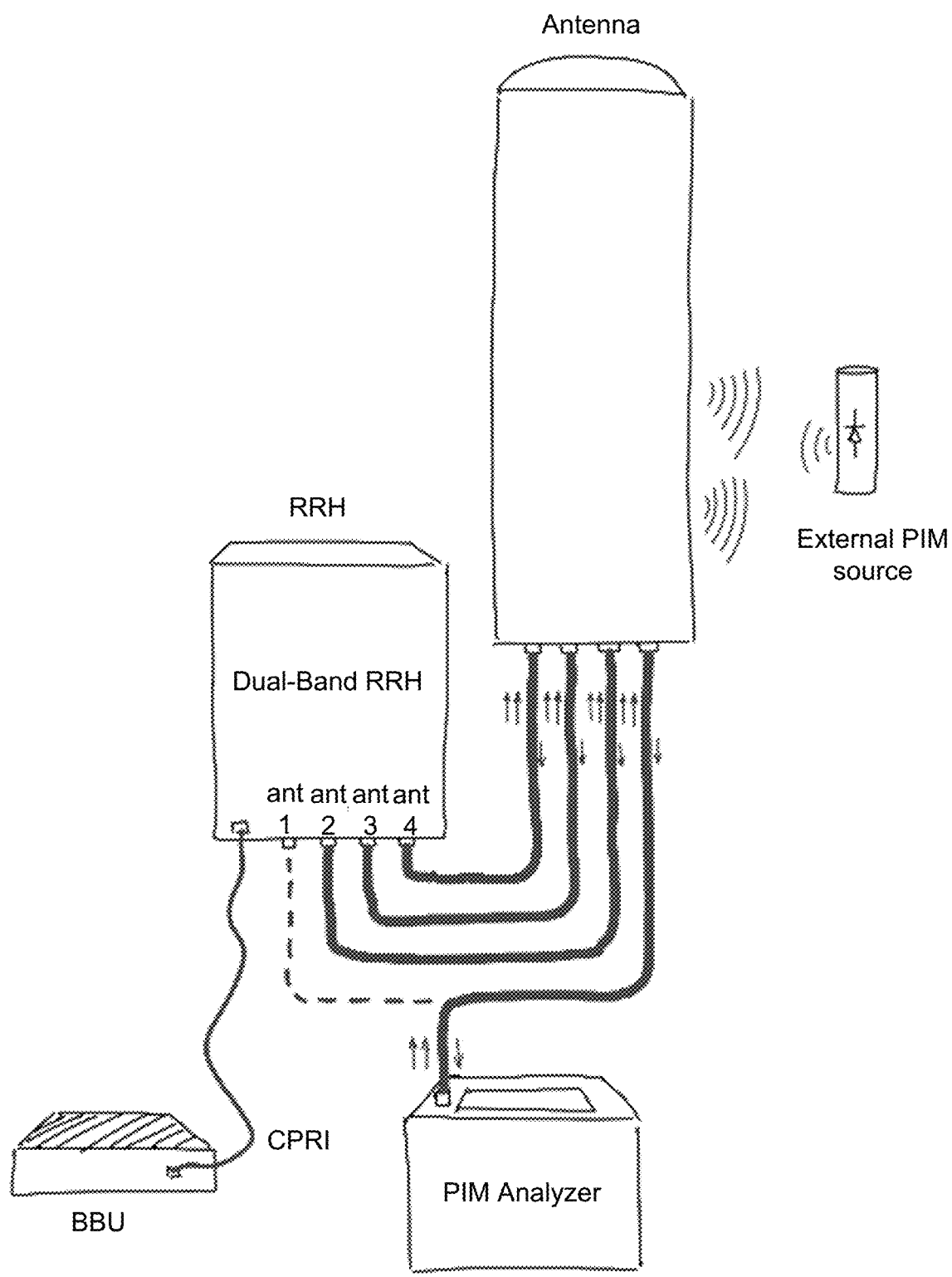
FIG. 1C illustrates how a conventional PIM analyzer is typically connected to the antenna of a dual-band base station.

FIG. 1B is a block diagram of a conventional PIM analyzer. Here, two CW signals are generated at the relevant frequencies F1 and F2. The CW signals are amplified using linear power amplifiers (typically to 43 decibel-milliwatt (dBm)) and then combined and transmitted out of a coaxial connector. The unit under test, typically a cable, connector, or antenna, is attached to the PIM analyzer via the coaxial connector. The combined CW signal is then used to illuminate (or excite) the unit under test. If the unit under test generates PIM, it will be reflected into the PIM analyzer. A receiver within the PIM analyzer measures the energy landing at one or more of the IM frequencies and records their levels. FIG. 1C illustrates how a conventional PIM analyzer is typically connected to the antenna of a dual-band base station. Specifically, RF jumpers may be disconnected from a remote radio head (RRH) (or remote radio unit (RRU)) and connected instead to the PIM analyzer. PIM analyzers are useful for testing cables, connectors, and other passive devices in a factory or laboratory environment. However, they have several shortcomings when it comes to testing a deployed base station at a cell site. Firstly, the use of a PIM analyzer requires access to the rooftop or tower in order to reach the RRH, which is often not straightforward. Also, the cell or cells using the antenna need to be "locked" (i.e., disabled, with RF transmission deactivated) in order to protect the safety of the technician as well as the equipment. Further, as mentioned above, RF jumpers need to be disconnected from the RRH and attached to the PIM analyzer in order for PIM measurements to be made. Connecting a PIM analyzer to two single-band base stations is even more difficult, as it requires connecting it to two different antennas. RF jumpers also need to be reconnected and the cell/cells need to be unlocked after PIM analysis is complete. PIM analyzers also require high power RF components and a large battery, and thus can be bulky and heavy (i.e., as large as a suitcase and weighing between 20 and 50 pounds). Another issue with using PIM analyzers is that the technician might inadvertently introduce PIM while disconnecting and reconnecting the RF jumpers. Moreover, most of today's base station antennas are multiple-input multiple-output (MIMO) antennas with four or more ports, whereas PIM analyzers are limited to only one or two ports. This means that the technician must repeatedly connect and disconnect the PIM analyzer to the different ports of the antenna in order to perform the various measurements for all of the ports.

Figure 1D:
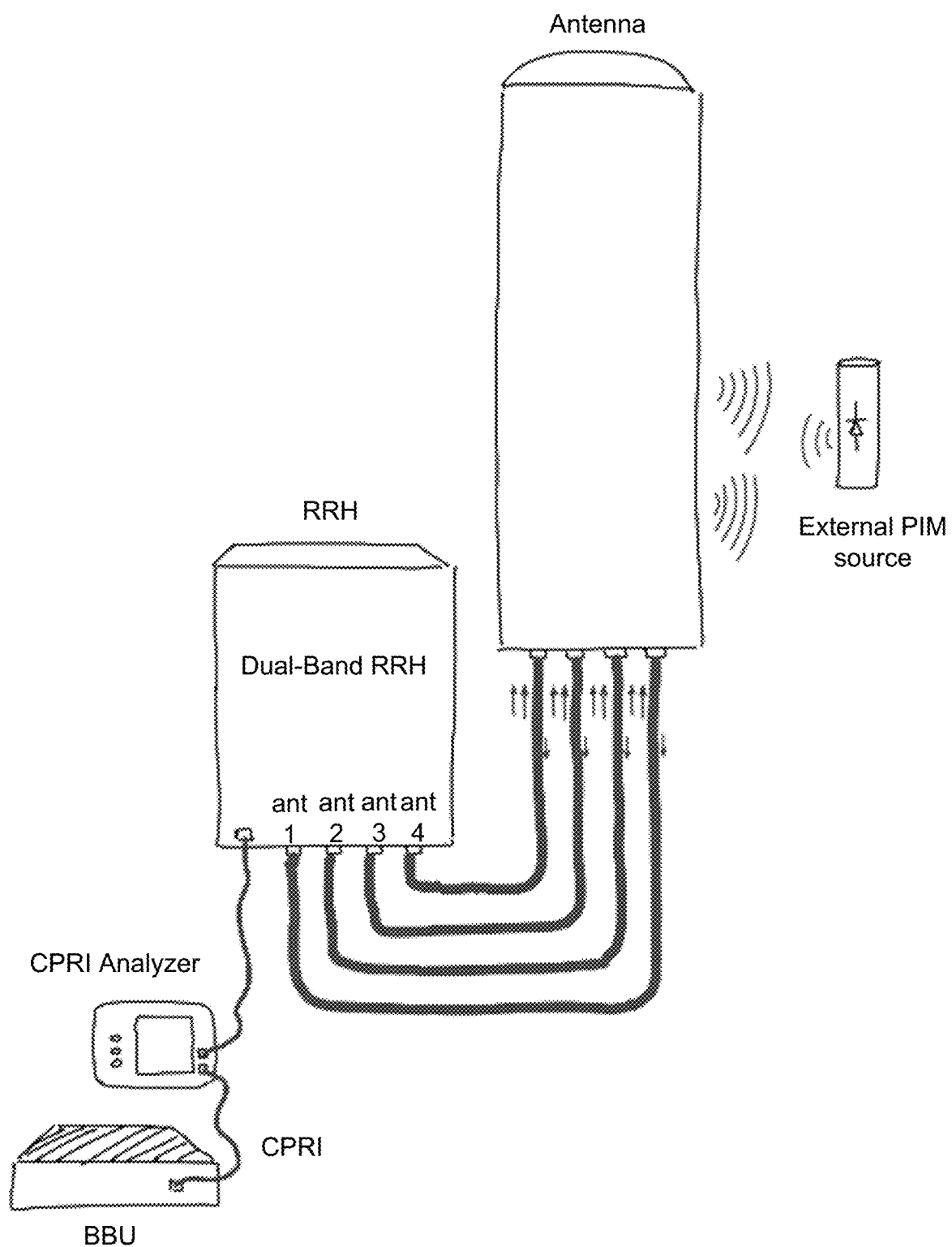
FIG. 1D illustrates how a conventional Common Public Radio Interface (CPRI)-based PIM analyzer is typically connected to a base station.

CPRI-based PIM detection can alternatively be used to help locate PIM. In this technique, a CPRI analyzer is connected to the CPRI or enhanced CPRI (eCPRI) link (i.e., an interface between an RRH and a baseband unit (BBU)). FIG. 1D illustrates how a conventional CPRI-based PIM analyzer is typically connected to a base station. The UL data stream flowing through the CPRI interface is inspected for PIM interference. If PIM interference is detected, the level of the PIM is measured and reported. CPRI-based PIM detection does not modify the DL data stream. Instead, the base station is left to operate in its normal mode, transmitting its (e.g., 4G/5G) DL signals. CPRI-based PIM detection addresses many of the problems discussed above with respect to typical PIM analyzer-based detection, since access to the RRH is not required. Also, testing can be done at the BBU, which is typically located at or within a building or at the bottom of the tower. Further, CPRI analyzers are much smaller and lighter than typical PIM analyzers (they are about size and weight of a laptop computer), which makes it much easier to handle. Additionally, a CPRI analyzer can easily measure PIM in all of the antenna ports of the RRH, since the UL signals from all of the antenna ports flow through the CPRI link. Finally, there is no risk of the technician introducing PIM while disconnecting and reconnecting RF jumpers since there is no need to do so with a CPRI analyzer. Notwithstanding, CPRI analyzers introduce other problems. First, PIM can be hard to detect and measure using mere traffic-based (e.g., 4G/5G) illumination. At test time (often conducted during off-peak hours), traffic conditions are generally low and so the base station might not be transmitting enough power to fully illuminate the PIM source. Artificial traffic may thus be enabled prior to testing, but this requires coordination with a network operator.

Figure 1E:
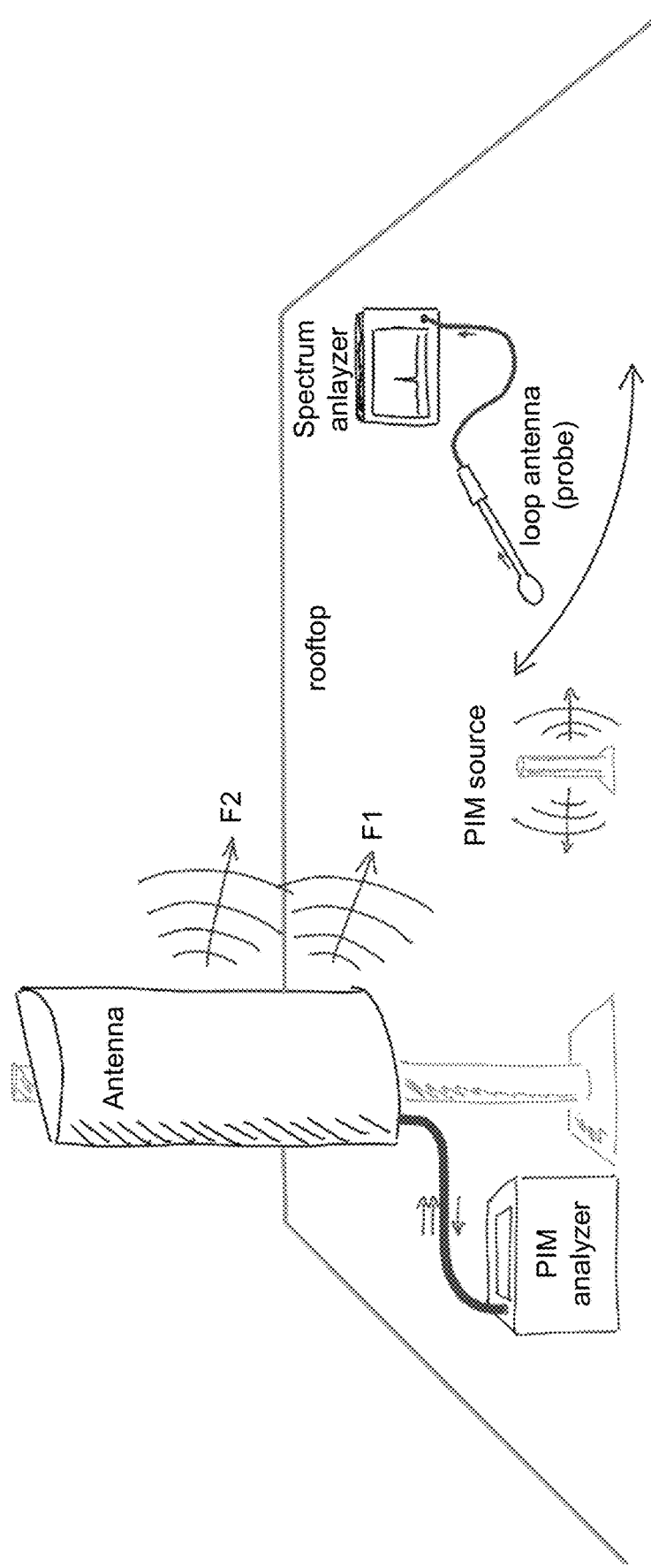
FIG. 1E illustrates a conventional PIM hunting process.

PIM hunting is another technique that involves using PIM test equipment to try to physically locate PIM sources. Specifically, a PIM analyzer is used in conjunction with a portable receiver or spectrum analyzer. Here, the PIM analyzer is connected to the base station antenna, and the portable receiver or spectrum analyzer is connected to a filter and a field probe. The PIM analyzer illuminates objects using two high power CW signals. The portable spectrum analyzer measures the level of the IM product. A technician manually moves the probe around to "look for" PIM sources, where humming sounds are set to track the power at the IM frequency. This process is analogous to using a metal detector on a beach to find metal objects. FIG. 1E illustrates a conventional PIM hunting process.

In all, a team can spend over a week performing PIM hygiene and hunting and still fail to find the source of PIM. This is especially true for very dense rooftops with numerous antennas and metal structures. Because of this, cellular operators often choose to tolerate the degraded performance caused by PIM rather than expending resources for PIM hygiene and hunting.

The subject disclosure describes illustrative embodiments of a PIM finder (method/system) for detecting, measuring, and/or locating PIM sources. Aspects of the PIM finder may be implemented in any suitable system or device, such as a BBU, an RRH/RRU, a CPRI device, and/or any other device or component of a radio access network (RAN). In exemplary embodiments, the PIM finder may include one or more algorithms that leverage a base station's own transmission and reception components/antennas to locate PIM source(s). Details of various functionalities provided by the PIM finder are described in more detail below. Embodiments of the system/method described herein reduce or eliminate a need for manual testing, which makes the PIM finding process simpler, faster, and more reliable.

Figure 1F:
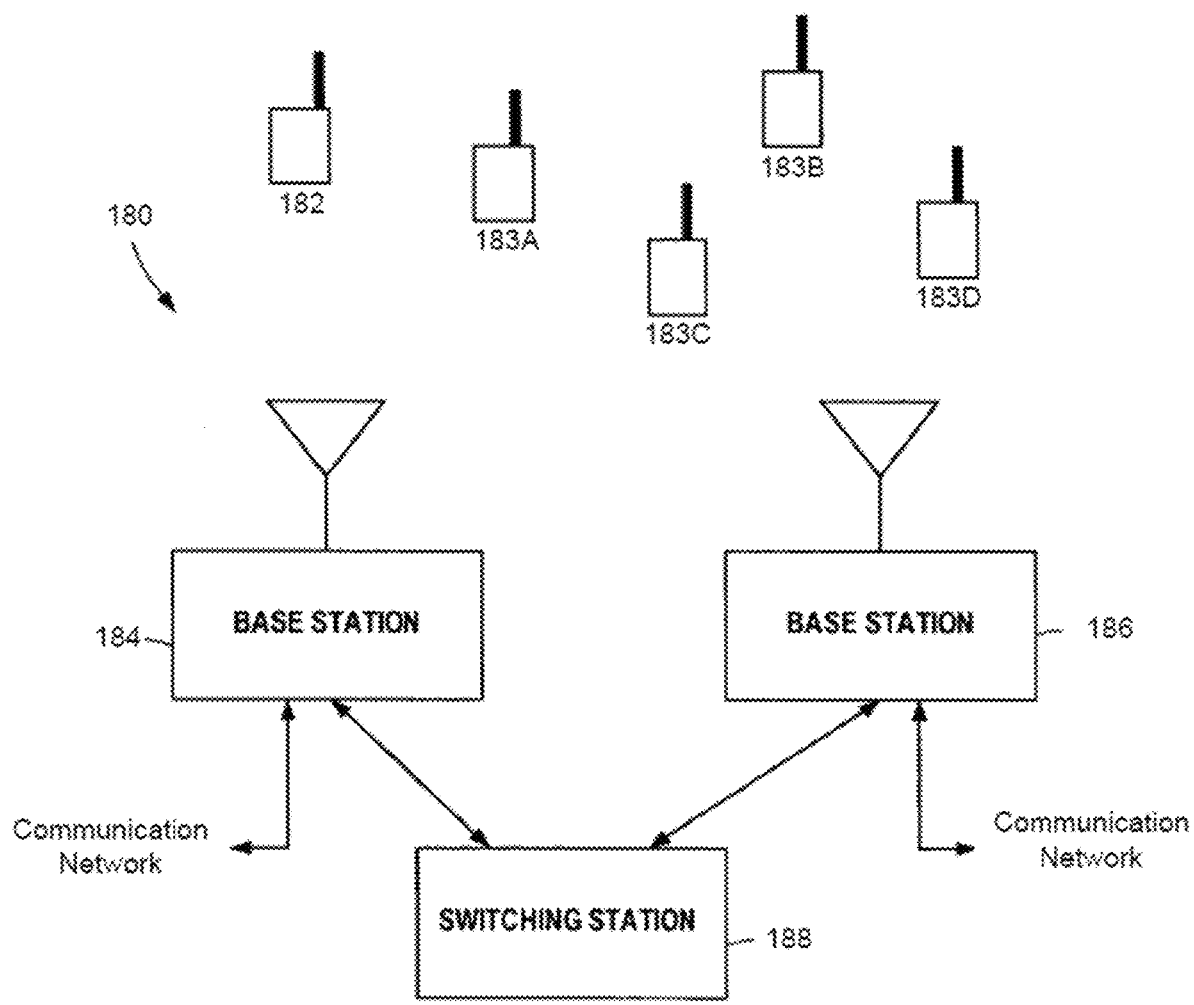
FIG. 1F depicts an exemplary, non-limiting embodiment of a telecommunications system in accordance with various aspects described herein.

FIG. 1F depicts an exemplary, non-limiting embodiment of a telecommunications system 180 in accordance with various aspects described herein. For example, system 180 can facilitate, in whole or in part, detecting, measuring, and/or locating PIM source(s). As shown in FIG. 1F, the telecommunications system 180 may include mobile units 182, 183A, 183B, 183C, and 183D, a number of base stations, two of which are shown in FIG. 1F at reference numerals 184 and 186, and a switching station 188 to which each of the base stations 184, 186 may be interfaced. The base stations 184, 186 and the switching station 188 may be collectively referred to as network infrastructure.

During operation, the mobile units 182, 183A, 183B, 183C, and 183D exchange voice, data or other information with one of the base stations 184, 186, each of which is connected to a conventional land line communications network. For instance, information, such as voice information, transferred from the mobile unit 182 to one of the base stations 184, 186 is coupled from the base station to the communications network to thereby connect the mobile unit 182 with, for example, a land line telephone so that the land line telephone may receive the voice information. Conversely, information, such as voice information may be transferred from a land line communications network to one of the base stations 184, 186, which in turn transfers the information to the mobile unit 182.

The mobile units 182, 183A, 183B, 183C, and 183D and the base stations 184, 186 may exchange information in either narrow band or wide band format. For the purposes of this description, it is assumed that the mobile unit 182 is a narrowband unit and that the mobile units 183A, 183B, 183C, and 183D are wideband units. Additionally, it is assumed that the base station 184 is a narrowband base station that communicates with the mobile unit 182 and that the base station 186 is a wideband digital base station that communicates with the mobile units 183A, 183B, 183C, and 183D.

Narrow band format communication takes place using, for example, narrowband 200 kilohertz (KHz) channels. The Global system for mobile phone systems (GSM) is one example of a narrow band communications system in which the mobile unit 182 communicates with the base station 184 using narrowband channels. Alternatively, the mobile units 183A, 183B, 183C, and 183D communicate with the base station 186 using a form of digital communications such as, for example, code-division multiple access (CDMA), Universal Mobile Telecommunications System (UMTS), 3GPP Long Term Evolution (LTE), or other next generation wireless access technologies. CDMA digital communication, for instance, takes place using spread spectrum techniques that broadcast signals having wide bandwidths, such as, for example, 1.2288 megahertz (MHz) bandwidths. The terms narrowband and wideband referred to above can be replaced with sub-bands, concatenated bands, bands between carrier frequencies (carrier aggregation), and so on, without departing from the scope of the subject disclosure.

The switching station 188 is generally responsible for coordinating the activities of the base stations 184, 186 to ensure that the mobile units 182, 183A, 183B, 183C, and 183D are constantly in communication with the base station 184, 186 or with some other base stations that are geographically dispersed. For example, the switching station 188 may coordinate communication handoffs of the mobile unit 182 between the base station 184 and another base station as the mobile unit 182 roams between geographic areas that are covered by the two base stations.

In various circumstances, the telecommunications system 180, and more particularly, one or more of the base stations 184, 186 can be undesirably subjected to interference. Interference can represent emissions within band (narrowband or wideband), out-of-band interferers, interference sources outside cellular (e.g., TV stations, commercial radio or public safety radio), interference signals from other carriers (inter-carrier interference), interference signals from UEs operating in adjacent base stations, PIM, and so on. Interference can represent any foreign signal that can affect communications between communication devices (e.g., a UE served by a particular base station).

Figures 2A, 2B:
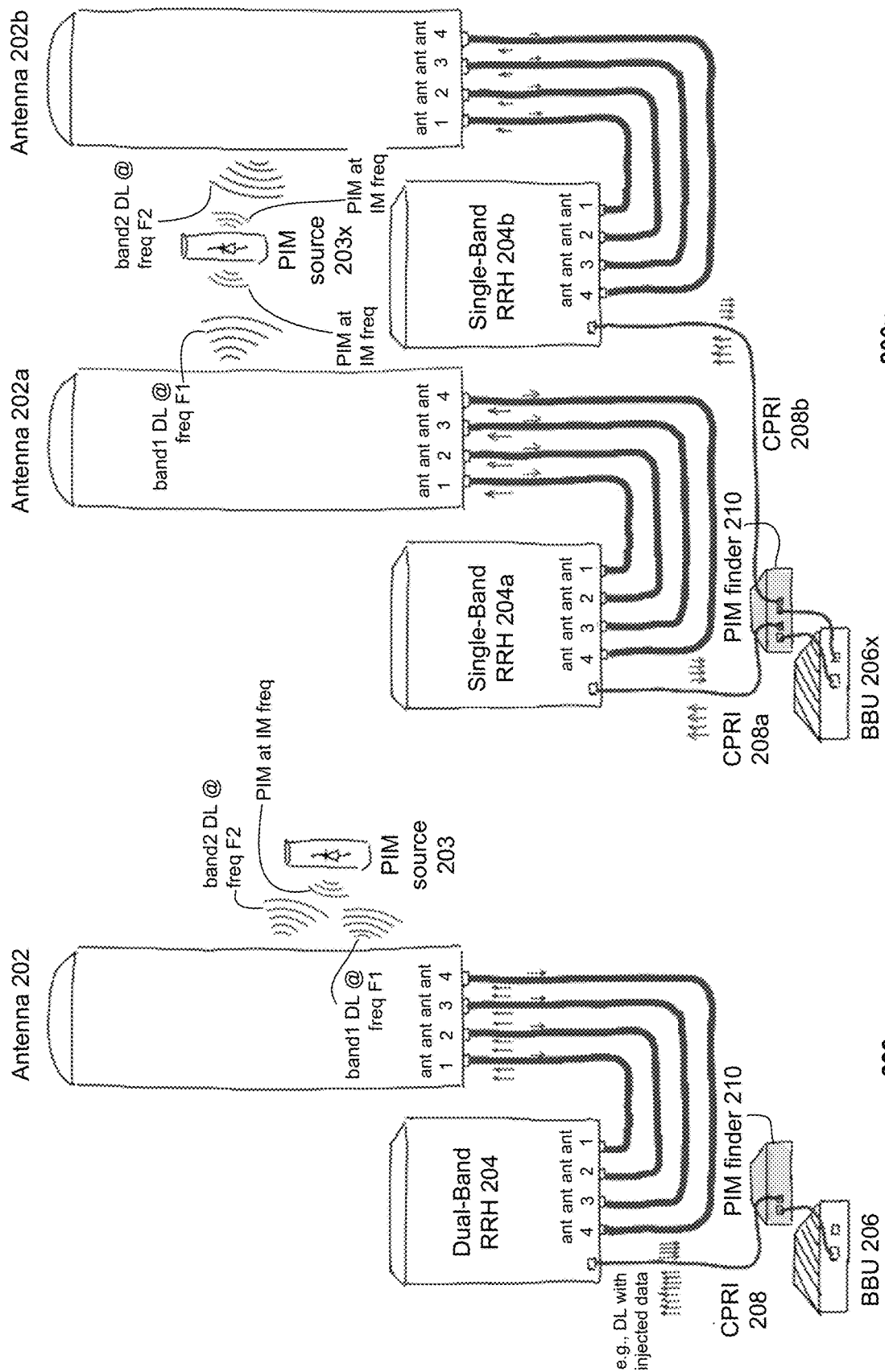
FIG. 2A is a block diagram illustrating an example, non-limiting embodiment of a system functioning within, or operatively overlaid upon, the communications system of FIG. 1F in accordance with various aspects described herein.
FIG. 2B is a block diagram illustrating an example, non-limiting embodiment of a system functioning within, or operatively overlaid upon, the communications system of FIG. 1F in accordance with various aspects described herein.

FIG. 2A is a block diagram illustrating an example, non-limiting embodiment of a system 200 functioning within, or operatively overlaid upon, the communications system 180 of FIG. 1F in accordance with various aspects described herein. FIG. 2B is a block diagram illustrating an example, non-limiting embodiment of a system 200x functioning within, or operatively overlaid upon, the communications system 180 of FIG. 1F in accordance with various aspects described herein. As shown in FIGS. 2A and 2B, a PIM finder 210 may be incorporated in the respective systems for detecting, measuring, and/or locating PIM sources.

Figure 2C:
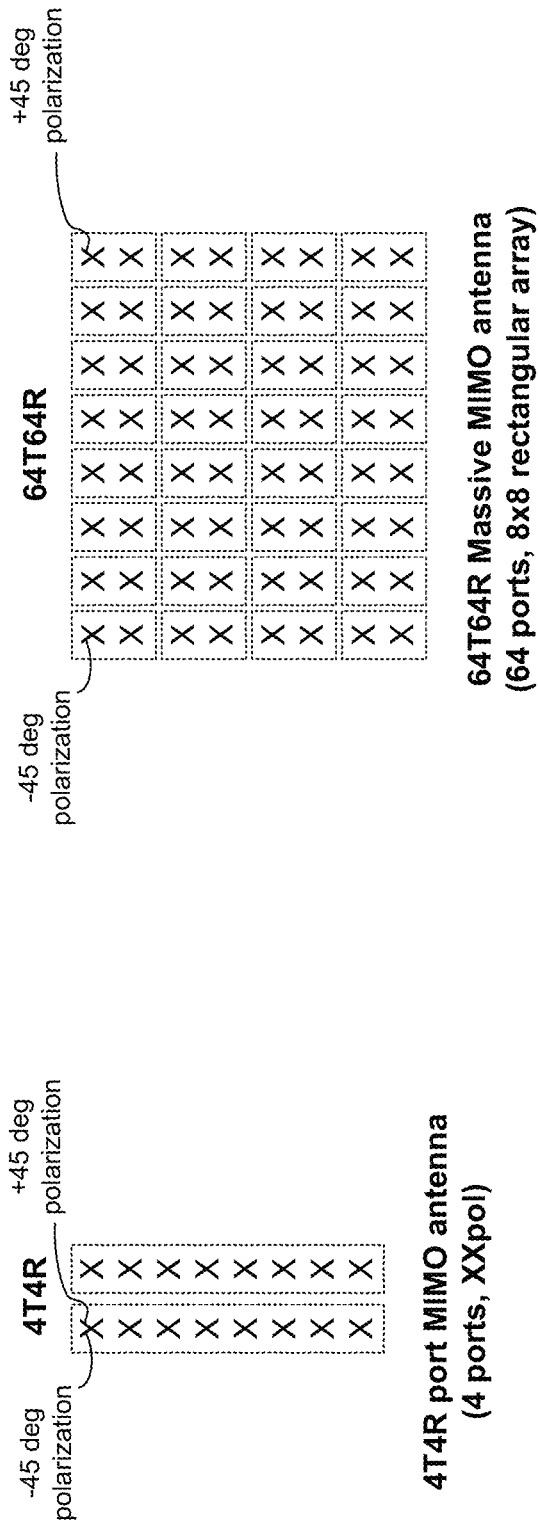
FIG. 2C illustrates example 4T4R and 64T64R antennas.

Referring to FIG. 2A, the communications system 200 may include an antenna (or antenna system) 202, a dual-band RRH 204, a BBU 206, and a PIM finder 210. As depicted, the PIM finder 210 may be integrated in a CPRI (or eCPRI) link 208 so as to interface the RRH 204 with the BBU 206. In exemplary embodiments, the PIM finder 210 may be implemented in a CPRI device (e.g., server) that is integrated with the CPRI (or eCPRI) link 208. A CPRI device may generally be configured to analyze and manipulate baseband in-phase (I) and quadrature (Q) (I/Q) data. In certain embodiments, the PIM finder 210 may additionally, or alternatively, be implemented in the RRH 204, in an RRH with integrated antenna, in the BBU 206, and/or one or more other components of the overall RAN. As shown in FIG. 2A, the antenna 202 may be communicatively coupled to the RRH 204 via antenna ports (ant 1, 2, 3, 4) and corresponding cables (e.g., coaxial cables or the like). Although not shown, the antenna 202 may include multiple columns of crossed-dipole (or crossed polarized) radiating elements-such as dual-slant crossed polarized (XXpol) elements. The polarizations of a pair (e.g., each pair) of crossed-dipole radiating elements may be −45° and +45° or any other orthogonal set of orientations. For operations below 2 gigahertz (GHz), a 4 port XXpol antenna, which supports four transmit and four receive (4T4R) MIMO, is often used. This may be considered a small antenna array, with two elements radiating at +45°, spaced one wavelength apart, and the other two elements radiating at −45°, also spaced one wavelength apart. For operations above 2 GHz, a larger number of individual feed antenna elements are often used. This larger configuration may be provided by various types of antennas, such as smart antennas, massive MIMO antennas, adaptive array antennas, or digital antenna arrays. These consist of larger antenna arrays, typically with the antenna elements in rectangular arrangements (e.g., 64T64R, with an 8 by 8 rectangular arrangement). FIG. 2C illustrates example 4T4R and 64T64R antenna configurations. Of course, it will be understood and appreciated that other antenna configurations can alternatively be used for the base station antenna.

Referring again to FIG. 2A, the RRH 204 may be configured to process radio signals received from and transmitted to the antenna 202. In some embodiments, the RRH 204 may be positioned proximate to the antenna 202 in order to minimize the length of the cables, which can reduce signal losses. The BBU 206 may be configured to perform signal modulation/demodulation, data encoding/decoding, and overall digital signal processing. In some embodiments, the BBU 206 may be positioned at a central location and set up to manage one or more RRHs.

Referring to FIG. 2B, the communications system 200x may be similar to the communications system 200 of FIG. 2A, but where the communications system 200x includes two single-band RRHs 204a and 204b instead of a dual-band RRH. Here, the PIM finder 210 may include multiple ports for CPRIs 208a, 208b to respectively facilitate interfacing of a BBU 206x with the single-band RRH 204a (which corresponds to an antenna or antenna system 202a transmitting band 1 or carrier 1) and the single-band RRH 204b (which corresponds to an antenna or antenna system 202b transmitting band 2 or carrier 2).

It will be understood and appreciated that, in any of the communications systems 200 and 200x, there may be more or fewer antennas (or antenna systems), more or fewer columns of radiating elements, more or fewer antenna ports and/or corresponding cables/wires, more or fewer RRHs, etc. Further, various types of radiating elements (e.g., in addition to or other than crossed-dipole elements) may be employed in any of the antennas or antenna systems.

The following describes various example operations that the PIM finder 210 may provide or undergo to facilitate detection, measurement, and/or locating of PIM/PIM sources.

In exemplary embodiments, the PIM finder 210 may facilitate generation of (e.g., digital) signals for the purpose of controlled illumination of PIM source(s), and leverage a base station's own devices/components (e.g., the RRH) to convert/amplify these signals for high powered RF transmission via the antenna(s). In one or more embodiments, the PIM finder 210 may modify a base station's DL data stream prior to data transmission via the RRH and the antenna array. A data stream is a sequence of digitally encoded signals that conveys information. In certain embodiments, the PIM finder 210 may modify the DL data stream by injecting certain (e.g., customized) digital signal(s) therein. In various embodiments, the injected signal(s) may correspond to CW signals, wideband signals, and/or any other signals or types of signals that can be transmitted via the antenna to facilitate detecting, measuring, and/or locating of PIM sources. By virtue of this inclusion of injected signal(s), the modified DL data stream may flow through the base station transmit path and be converted into high power RF by the RRH. The high power RF signals may then be transmitted through the cables and out of the antenna array. It is to be understood and appreciated that the above-described signal generation/injection may be implemented in any suitable device/component of a base station, such as the RRH, an RRH with integrated antenna, a CPRI device, the BBU, and/or one or more other components of the RAN. Furthermore, the signal generation/injection functionality may be (e.g., manually) activated and deactivated on demand, which allows for convenient PIM testing as desired. In any case, the PIM finder 210 may monitor UL signals for PIM signals so as to detect, measure, and/or locate corresponding PIM sources.

In one or more embodiments, a method may thus include detecting, measuring, and/or locating PIM by temporarily taking over a transmit data stream, injecting a signal therein, using the base station to amplify the signal, and illuminating the PIM source therewith. The method may further include using a receiver of the base station to detect and measure the PIM. The method may be implemented in the base station, an RRU/RRH, an RRH with integrated antenna, a BBU, a CPRI device, and/or another device in a RAN. The PIM may be internal to the base station (e.g., self-generated by component(s) of the base station) or may be generated by external sources.

In one or more embodiments, the PIM finder 210 may additionally, or alternatively, leverage AoA and/or beamforming techniques to facilitate detecting, measuring, and/or locating of PIM sources. In practice, AoA and beamforming techniques are generally enabled only when antenna arrays are involved. Thus, in various embodiments, the antenna 202 (or 202a and/or 202b) may include one or more antenna arrays. For instance, the antenna 202 may be a MIMO antenna. A MIMO antenna allows for multiple signals to be simultaneously transmitted and received at the base station. In one or more embodiments, multiple antenna elements of the antenna may be housed in a single radome. The following are brief descriptions of the techniques of AoA and beamforming, one or more of which the PIM finder 210 may implement for detecting, measuring, and/or locating PIM source(s).

Beamforming involves defining a radiation pattern, and more particularly a shape (e.g., width), of a beam using an antenna array, and beamsteering or beam rotation involves pointing of a beam in particular directions so as to change the direction of the main lobe of the radiation pattern. Elements in an antenna array may be "combined" in such a way that signals at particular angles undergo constructive interference while others undergo destructive interference. Beamsteering can be accomplished by changing the relative phases of the RF signals that drive the antenna elements associated with the beam (which can be done mathematically or via circuitry). As a result, this directs the transmit signal towards an intended direction.

Beamforming may be performed differently depending on the antenna configuration. There are various ways that antenna elements can be arranged or interconnected. For instance, a one-dimensional antenna may include multiple (e.g., 4) columns of crossed-dipoles, where dipoles of the same polarization in a given column are coupled to the same port or connector (e.g., 8 ports in total for a 4-column antenna). From an antenna connectivity perspective, the antenna may be virtually treated as a single row of radiating elements, which enables beamforming in only the azimuth direction. Phase shifts for beamsteering in the azimuth direction may be introduced between the dipoles of the same polarization across the columns (i.e., introduce relative phase shifts between some or all of the +45° dipoles; introduce relative phase shifts between some or all of the −45° dipoles). In such a one-dimensional antenna, beamsteering in the elevation direction may be achieved by physically tilting the antenna or its housing—i.e., beam tilting. Beam tilting involves aiming the main lobe of the vertical plane radiation pattern of the antenna above or below the horizontal plane. This can be done mechanically or electrically (via remote actuators and position sensors). Electrical tilt is known as remote electrical tilt (RET) and is part of the open specification of the Antenna Interface Standards Group (AISG) for antenna device control interfacing. In a two-dimensional antenna, columns of radiating elements may be divided into two or more sections, where dipoles of the same polarization in a given column of a given section is coupled to the same port or connector. As an example, 4 columns of crossed-dipoles may be separated into two sections (e.g., top and bottom), which allows for a two-row configuration from an antenna connectivity perspective and 16 ports or connectors. Further sectioning in an antenna would result in even more rows of virtual antennas. In any case, a two-dimensional antenna allows for beamforming in both the azimuth and elevation directions—i.e., without any need for beam tilting. Phase shifts for beamsteering in the azimuth direction may be introduced between the dipoles of the same polarization across the columns in a section (i.e., introduce relative phase shifts between some or all of the relevant +45° dipoles; introduce relative phase shifts between some or all of the relevant −45° dipoles). Phase shifts for beamsteering in the elevation direction may be introduced between the dipoles of the same polarization across the sections in a column (i.e., introduce relative phase shifts between some or all of the relevant +45° dipoles; introduce relative phase shifts between some or all of the relevant −45° dipoles). Certain antennas, such as massive MIMO antennas, have this two-dimensional configuration and provide for spatial multiplexing, advanced beamforming, and/or 3D beamforming, where the phase/amplitude of each radiating element are independently controllable and any set of the radiating elements are controllable in the aggregate.

Figure 2D:
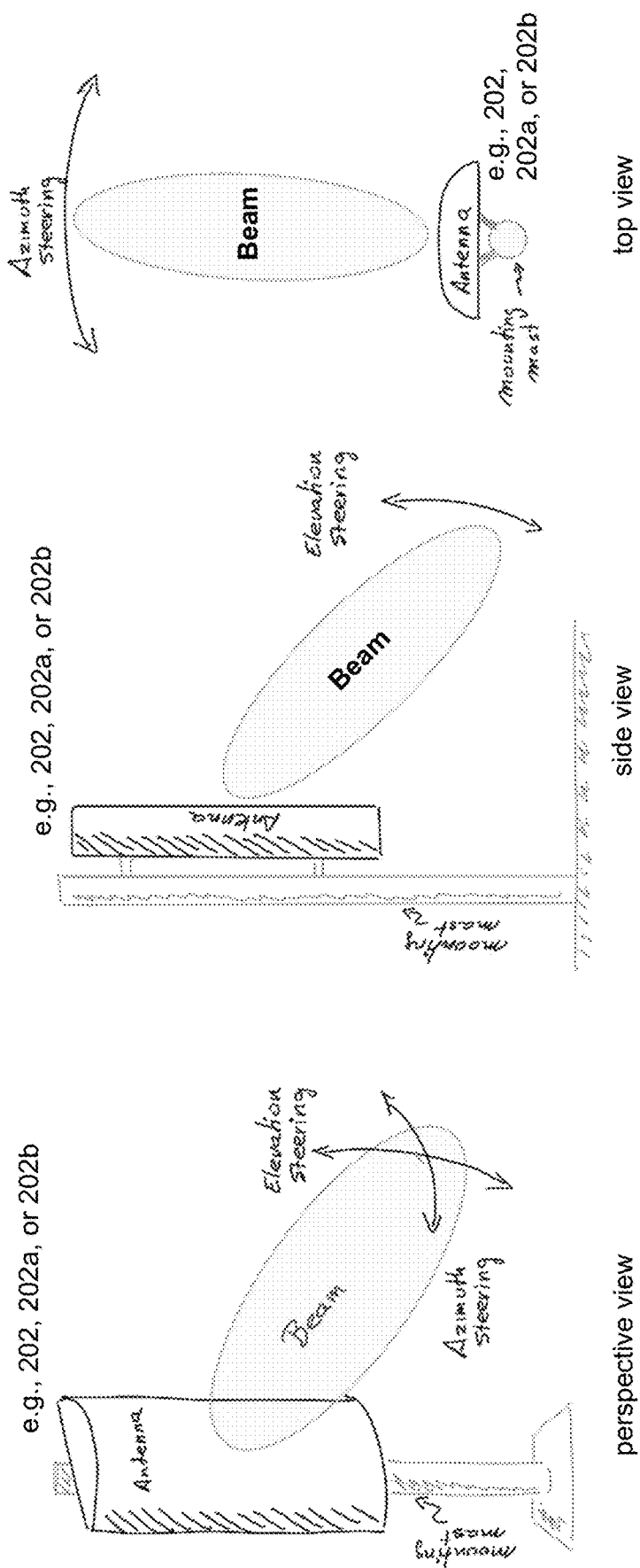
FIG. 2D shows various views of an antenna system in which beamforming and beam steering are performed in accordance with various aspects described herein.
Figure 2E:
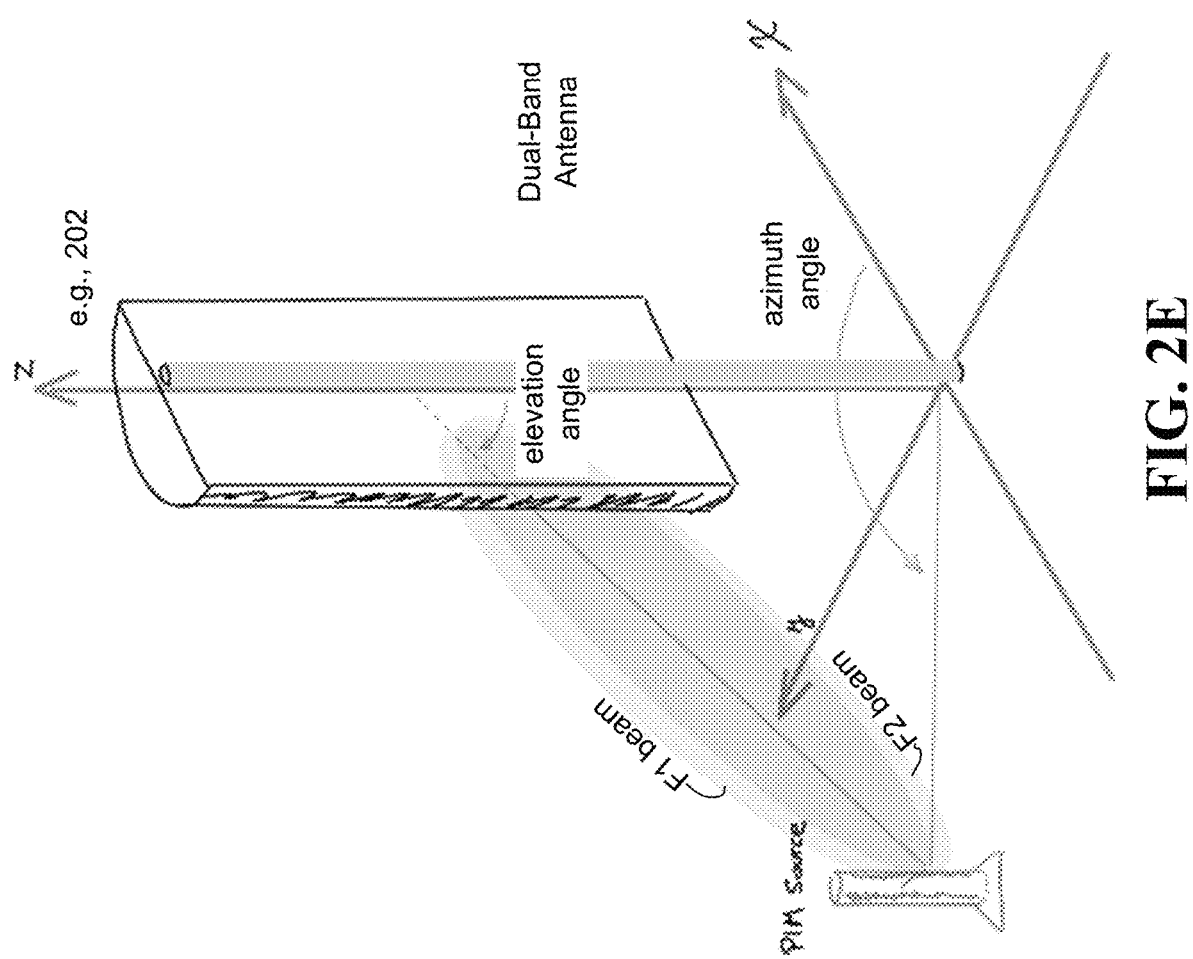
FIG. 2E illustrates beams of a dual-band system that are directed toward a PIM source, in accordance with various aspects described herein.
Figure 2F:
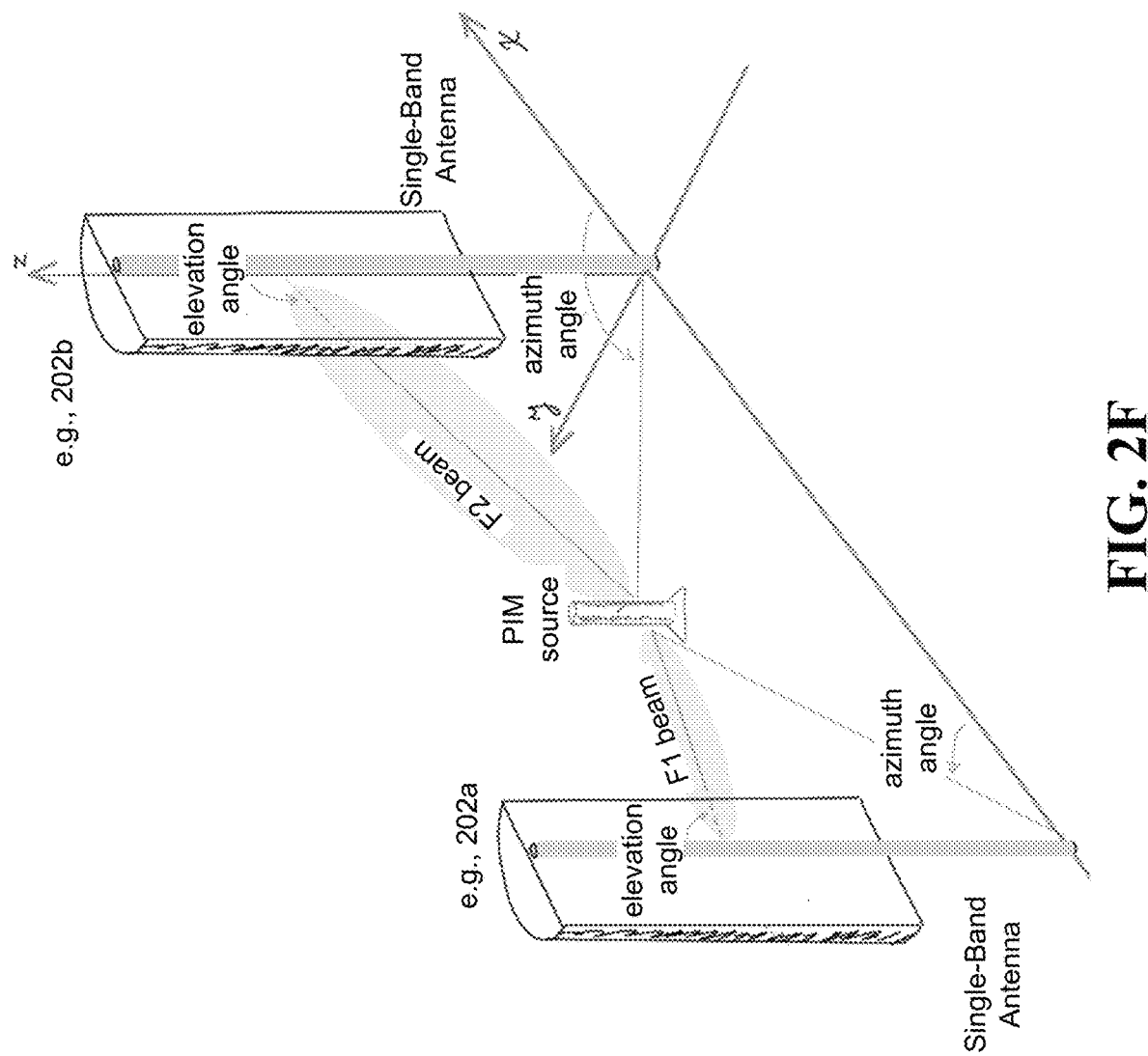
FIG. 2F illustrates beams of two single-band systems that are directed toward a PIM source, in accordance with various aspects described herein.

In exemplary embodiments, the PIM finder 210 may cause a base station's transmitters/antenna elements to generate and transmit a beam in each of the DL bands or carriers, and steer (or sweep) the beams in various directions (e.g., horizontally and/or vertically) so as to illuminate potential PIM sources at different azimuth and/or elevation angles. As the beams are swept, the PIM finder 210 may monitor PIM levels. When the beams are pointed in a particular direction (e.g., particular azimuth and/or particular elevation) and the high power RF signals become incident on a PIM source, an RF wave (i.e., PIM signal) may be generated by the PIM source by virtue of mixing of the high power RF signals and become incident on the antenna array as a PIM signal. In such a case, the monitored level of generated PIM may increase or peak, which would indicate that the PIM source is located in that particular direction (in azimuth and/or elevation). In essence, the azimuth and/or elevation angles of the beam that causes the generated PIM to peak may be used to identify the location of the PIM source. If there are multiple beams that cause generated PIM to peak, it might suggest that there are multiple PIM sources. One helpful (but non-limiting) analogy of beamsteering for PIM locating is to compare the base station's transmit beam to a flashlight and the PIM source to a mirror. Here, steering the transmit beam may be analogous to moving a flashlight about an area. As this occurs, we can look for reflections of light. When the flashlight is directed toward a mirror ("PTIM source"), the energy reflects ("PIM"), allowing for visual detection of the location of the mirror. FIG. 2D shows various views of an antenna system in which beamforming and beam steering are performed in accordance with various aspects described herein. FIG. 2E illustrates beams of a dual-band system that are directed toward a PIM source, in accordance with various aspects described herein. FIG. 2F illustrates beams of two single-band systems that are directed toward a PIM source, in accordance with various aspects described herein.

In some embodiments, the PIM finder 210 may alternatively cause a base station's transmitters/antenna elements to generate and transmit a plurality of simultaneous beams, or substantially simultaneous beams (such as within a threshold difference in time from one another), in each DL band or carrier so as to illuminate potential PIM sources at numerous azimuth and/or elevation angles (e.g., all at once). This is analogous to a "shotgun" approach in that numerous beams can be emitted in various directions, where at least some of these beams may become incident on a PIM source and result in generated PIM. As the beams are emitted in this manner, the PIM finder 210 may monitor PIM levels. In a case where particular beam(s) become incident on a PIM source, the monitored level of generated PIM may increase or peak, which would indicate that PIM source(s) are located in the direction(s) (in azimuth and/or elevation) that correspond to those particular beam(s).

In one or more embodiments, a method may thus include locating an external PIM source by beam steering RF energy using an antenna array or antenna arrays, and measuring RF waves(s) that are generated by a PIM source and that are incident on the antenna array or arrays. The antenna array or arrays may correspond to a base station or may correspond to multiple base stations. The PIM may be generated via mixing of a signal or signals transmitted out of the antenna array or arrays. The RF wave(s) that are generated by the PIM source may have resulted from illumination by signal(s) transmitted by the antenna array or arrays. The RF wave(s) that are generated by the PIM source may have resulted from illumination by signal(s) transmitted by another antenna array or arrays. The method may be implemented in the base station, an RRU/RRH, a BBU, a CPRI device, and/or another device in a RAN. The method may involve adjusting a direction of a transmit beam to facilitate locating of the PIM source. The method may involve (e.g., simultaneously or substantially simultaneously, such as within a threshold difference in time from one another) transmitting multiple beams in multiple directions to facilitate locating of the PIM source. The method may include computing an AoA of the RF wave(s) generated by the PIM source to obtain an estimated location of the interference source. The elevation of the beam may be adjusted based on communications with an RET system.

Figure 2G:
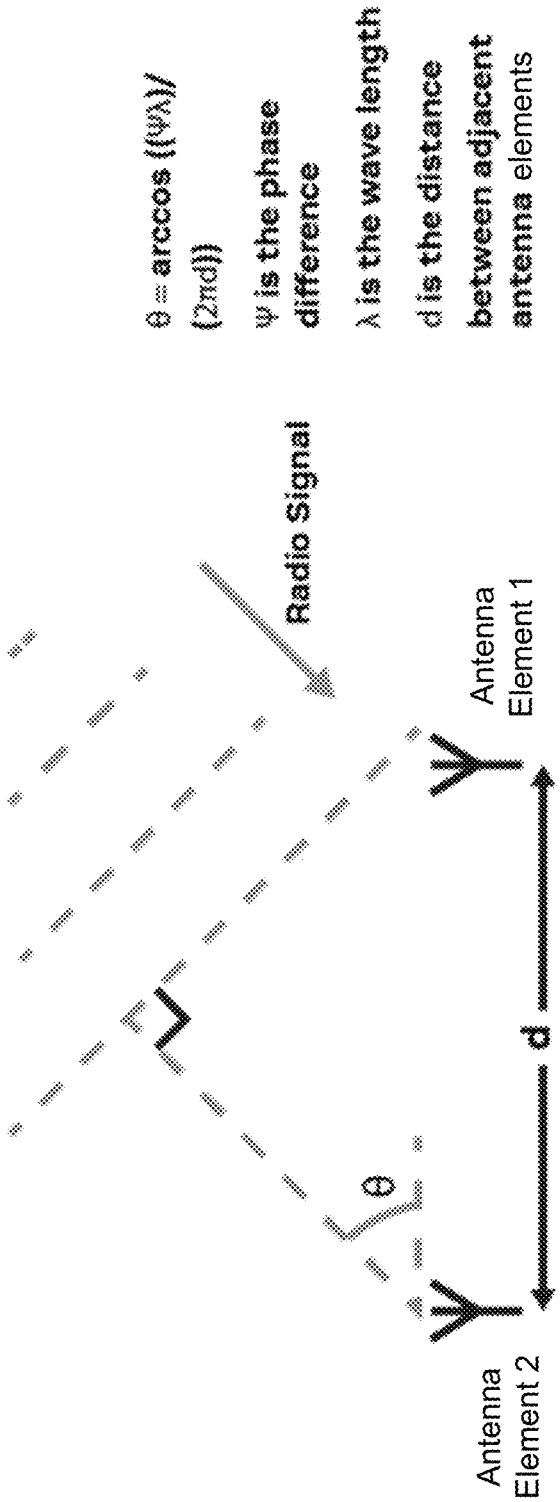
FIG. 2G illustrates the general principle of measuring angle of arrival (AoA) which can aid in locating a PIM source, in accordance with various aspects described herein.

External PIM sources may be located by computing the AoA of an RF wave (i.e., PIM signal) that is generated by a PIM source and that is incident on the various elements of an antenna array or arrays. FIG. 2G illustrates the general principle of measuring AoA in the azimuth direction, which can aid in locating a PIM source, in accordance with various aspects described herein. In one or more embodiments, the PIM signal may be received and digitized by the RRH, resulting in UL data, which can then be used to measure the AoA and thus aid in locating the PIM source. AoA measurements can be performed regardless of whether controlled illumination or uncontrolled illumination is performed by the base station. In one or more embodiments, the PIM finder 210 may monitor received interference energy levels to identify candidate PIM signals (e.g., based on energy levels that exceed a threshold or that exhibit a maximum value) for AoA computations. In various embodiments, AoA may be calculated by measuring the time difference of arrival (TDOA) (or phase difference) of the received PIM signal between individual elements of the antenna array. AoA can be thought of as beamforming in reverse. In a one-dimensional antenna, the difference in phase between signals received from different radiating elements may be measured/computed to determine AoA in the azimuth direction, and beam tilting may be employed in the elevation direction by controlling an RET system to find the elevation at which the PIM signal power is maximized. In a two-dimensional antenna (or more advanced antenna), differences in phase between radiating elements across columns and sections may be measured/computed to determine AoA in both the azimuth and elevation directions. Of course, the resolution of the AoA will be proportional to the number of receive antenna elements. Therefore, in a case where a base station utilizes a massive MIMO antenna, for instance, the PIM finder 210 may be able to (e.g., precisely) measure the azimuth and elevation angles of arrival for a PIM source. For instance, assuming that there is only a single PIM source, in a case of a 64T64R 8×8 array with 64 ports, receive data captured by the array may be analyzed in a matrix to fairly accurately obtain an azimuth angle and an elevation angle for the PIM source.

In one or more embodiments, a method may thus include locating an external PIM source by computing AoA of RF waves(s) that are generated by a PIM source and that are incident on an antenna array or antenna arrays. The antenna array or arrays may correspond to a base station or may correspond to multiple base stations. The PIM may be generated via mixing of a signal or signals transmitted out of the antenna array or arrays. The RF wave(s) that are generated by the PIM source may have resulted from illumination by signal(s) transmitted by the antenna array or arrays. The RF wave(s) that are generated by the PIM source may have resulted from illumination by signal(s) transmitted by another antenna array or arrays. The method may be implemented in the base station, an RRU/RRH, a BBU, a CPRI device, and/or another device in a RAN.

In various embodiments, the PIM finder 210 may additionally, or alternatively, be configured with one or more algorithm(s) for estimating physical characteristic(s) of a PIM source by analyzing the polarization of the received PIM signal. In this context, illumination of the PIM source may be controlled (e.g., via signal injection) or uncontrolled (e.g., based on data traffic), or can even be due to transmissions from a different antenna system. In an example case, assume that a vertically-oriented PIM source is located a distance away in front of an antenna array, and that uncontrolled illumination is performed. Assume that the antenna array has 4 ports connected to +45° and −45° dipoles of a pair of crossed-dipoles. Here, the antenna array may transmit DL signals in different bands or carriers (e.g., at different frequencies), possibly illuminating the vertically-oriented object. If the object is metallic (e.g., a metal pipe), it will act as an antenna and receive the vertical components of the DL RF signals transmitted by the base station. Further assuming that the object is corroded, it will generate PIM and radiate the PIM signal as a vertically-polarized RF wave towards the antenna array. The antenna array may receive the RF wave incident on the various +45° and −45° dipoles. The PIM finder 210 may employ algorithm(s) that are configured to compare receive signals received via the +45° and −45° dipoles of (e.g., each of) one or more crossed-dipole pairs and compute the polarization of the PIM signal. In this example case, the PIM finder 210 may determine that the PIM signal is vertically-polarized, and thus the PIM source is a vertically-oriented object. In various embodiments, the PIM finder 210 may identify an (e.g., approximate) aspect ratio and thus an estimated shape of the PIM source based on an analysis of the PIM signal that is received via two dipoles of a crossed-dipole pair (see, for instance, any of FIGS. 2H and 2I, which illustrate the energy of an example PIM signal received via different pairs of crossed-dipole radiating elements in accordance with various aspects described herein).

Figure 2H:
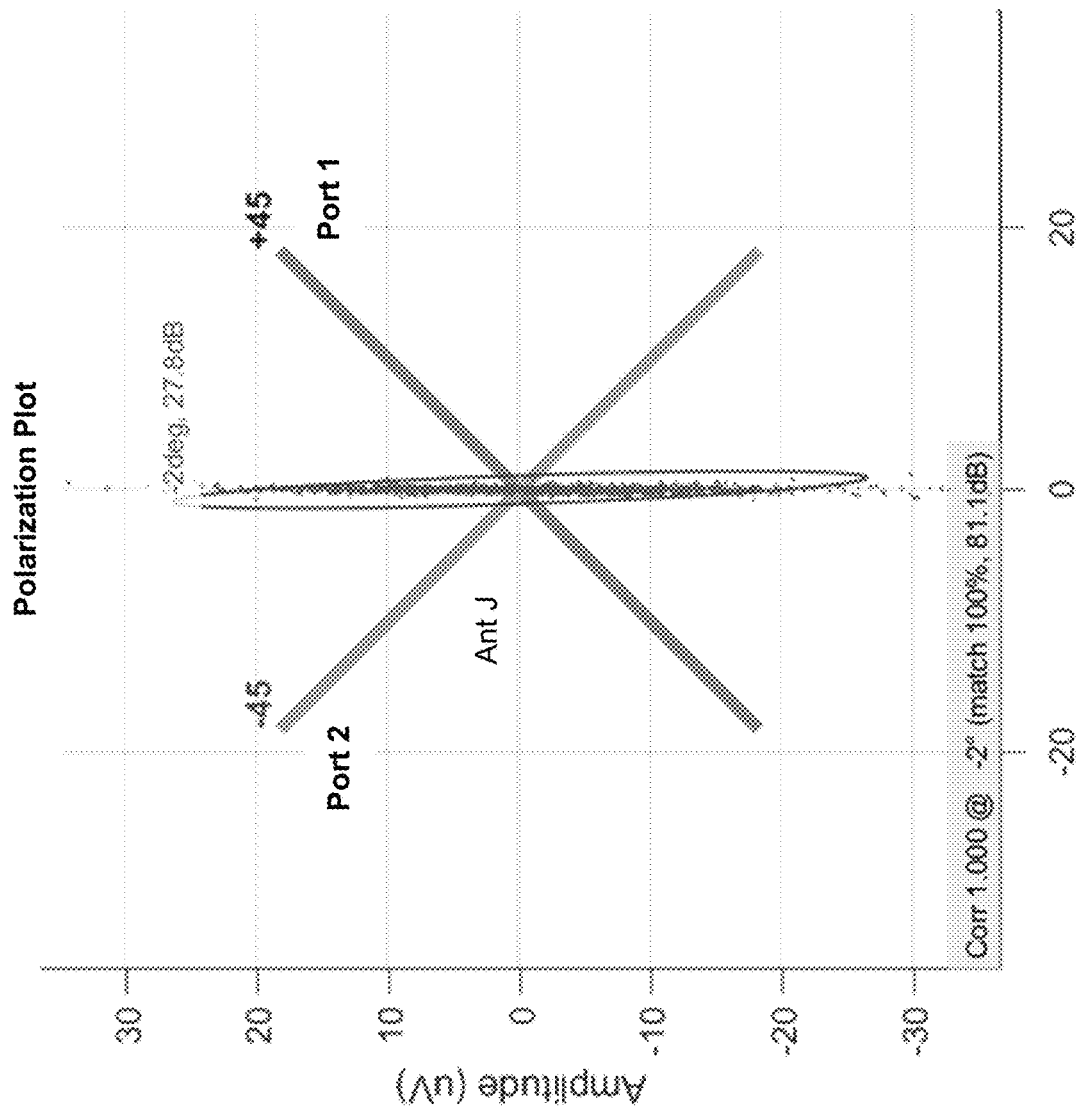
FIGS. 2H and 2I illustrate the energy of an example PIM signal received via different pairs of crossed-dipole radiating elements in accordance with various aspects described herein.
Figure 2I:
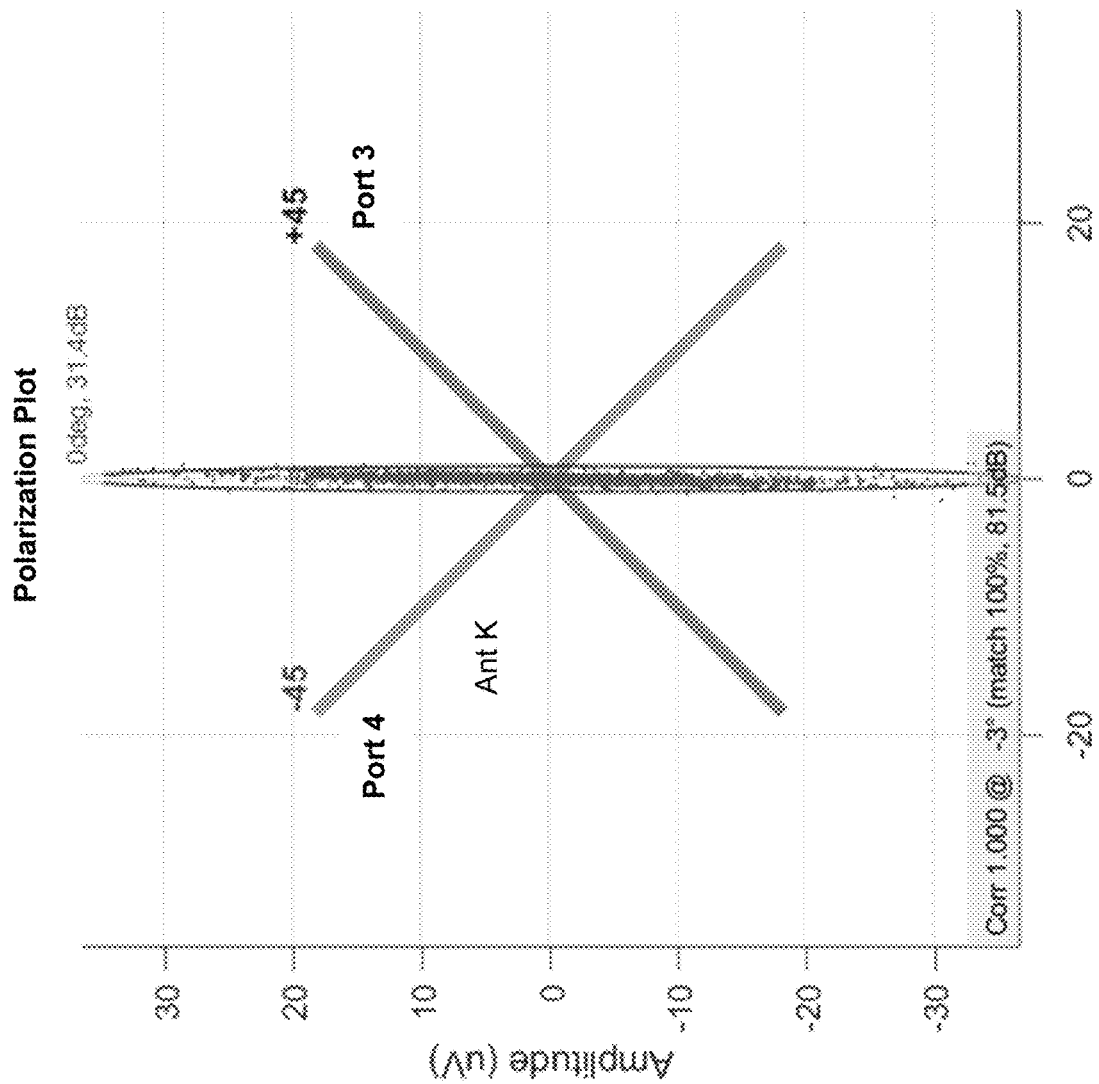
Figure 2J:
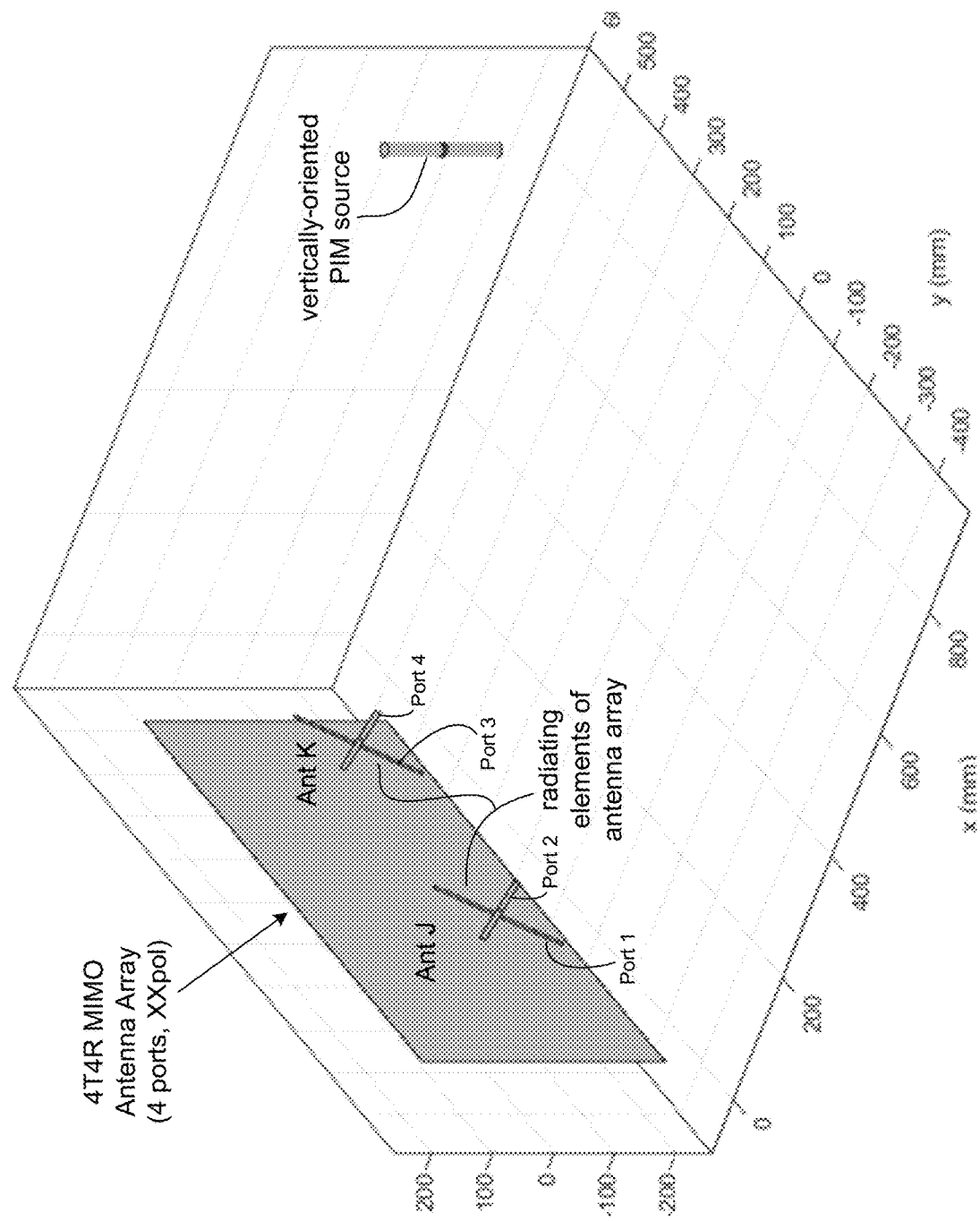
FIG. 2J illustrates (e.g., visual and/or text-based) information that may be generated by a PIM finder based on detecting, locating, and/or measuring PIM, in accordance with various aspects described herein.

In one or more embodiments, the PIM finder 210 may leverage receive signals received via two or more pairs of orthogonally-polarized radiating elements to gain further insight into the shape and/or the location of the PIM source. FIG. 2J illustrates (e.g., visual and/or text-based) information that may be generated by a PIM finder based on detecting, locating, and/or measuring an example PIM source, in accordance with various aspects described herein. The receive signals shown in FIGS. 2H and 2I correspond to the two pairs of crossed-dipole radiating elements Ant J and Ant K shown in FIG. 2J. As shown in FIGS. 2H and 2I, receive signals received via the pairs of crossed-dipole radiating elements may each indicate a PIM signal that exhibits a vertically-oriented shape corresponding to the vertically-oriented PIM source that is located in front of an XXpol base station antenna system shown in FIG. 2J (of course, the energy of the PIM signal is greater for Ant K since it is closer to the object). In some embodiments, the PIM finder 210 may perform comparison(s) of (or computation(s) relating to) the received signals. For instance, the PIM finder 210 may compare and analyze the overall structure of the two PIM signals to determine an estimated shape of the PIM source as well as a relative location of the PIM source (e.g., closer to the left of the antenna system). As another example, the PIM finder 210 may additionally, or alternatively, employ AoA computations (e.g., based on TDOA) on the received signals to determine the direction of the incoming PIM signal. In certain embodiments, the PIM finder 210 may generate information regarding an aspect ratio of the PIM source and thus an estimated shape of the PIM source. Some or all of the generated information may be presented in a suitable format, such as a text-based format and/or a graphical format (e.g., the illustration shown in FIG. 2J) so as to aid a technician in visually identifying or locating the PIM source in the roof-top or tower.

In one or more embodiments, a method may thus include estimating a physical shape of an object (or PIM source) that is responsible for generating PIM, by measuring a polarization of RF wave(s) that are generated by the object and that are incident on an antenna array or antenna arrays. The antenna array or arrays may correspond to a base station or may correspond to multiple base stations. The PIM may be generated via mixing of a signal or signals transmitted out of the antenna array or arrays. The RF wave(s) that are generated by the PIM source may have resulted from illumination by signal(s) transmitted by the antenna array or arrays. The RF wave(s) that are generated by the PIM source may have resulted from illumination by signal(s) transmitted by another antenna array or arrays. The method may be implemented in the base station, an RRU/RRH, a BBU, a CPRI device, and/or another device in a RAN. The antenna array or arrays may include antenna elements that have different polarizations.

In some embodiments, the PIM finder 210 may additionally, or alternatively, be configured to estimate physical characteristic(s) of a PIM source (e.g., aspect ratio/shape) via controlled illumination using linearly-polarized RF wave(s). For instance, the PIM finder 210 may cause linearly-polarized transmit signal(s), which can be adjusted (e.g., rotated or modified mathematically or electronically) to any desired orientation (e.g., vertically, horizontally, or any other angle(s)) to help determine or reveal the polarization of a PIM source. When the polarization of the transmit signal(s) match the polarization of the PIM source, the level of the generated and received PIM energy will be larger (e.g., maximized or greater than a threshold energy), which allows the approximate shape of the object to be inferred or determined. For instance, assume that a PIM source is vertically oriented. In this example, if a pair of crossed-dipole radiating elements (e.g., +45° and −45° dipoles) are used to transmit a horizontally-polarized signal, little to no PIM energy would be received by the orthogonal elements (i.e., a sum of the energy of the signals received by the orthogonal elements may be zero). However, if the pair of crossed-dipole radiating elements are used to transmit a vertically-polarized signal, a maximum amount of PIM energy would be received by the orthogonal elements (i.e., a sum of the energy of the signals received by the orthogonal elements may be a maximum). In any case, further insight into the shape and/or location of the PIM source can also be similarly obtained—e.g., by illuminating the object with linearly-polarized RF signals transmitted using two or more pairs of crossed-dipole radiating elements (like that shown in FIG. 2J).

In one or more embodiments, a method may thus include estimating a physical shape of an object (or PIM source) that is responsible for generating PIM, by transmitting linearly-polarized RF wave(s) at different polarization angles using an antenna array or arrays so as to illuminate the object, and measuring RF wave(s) that are generated by the object responsive to the illuminations at different polarization angles. The polarization angle of the linearly-polarized RF wave(s) may be changed so as to facilitate identification of the polarization angle at which the magnitude of the RF wave generated by the object is greater than a threshold (or is at a maximum). Multiple linearly-polarized RF waves at different polarization angles may be transmitted (e.g., simultaneously or substantially simultaneously, such as within a threshold difference in time from one another) to facilitate identification of the polarization angle at which the magnitude of the RF wave generated by the object is greater than the threshold (or is at the maximum). The method may be implemented in the base station, an RRU/RRH, a BBU, a CPRI device, and/or another device in a RAN. The antenna array or arrays may include antenna elements that have different polarizations.

Figure 2K:
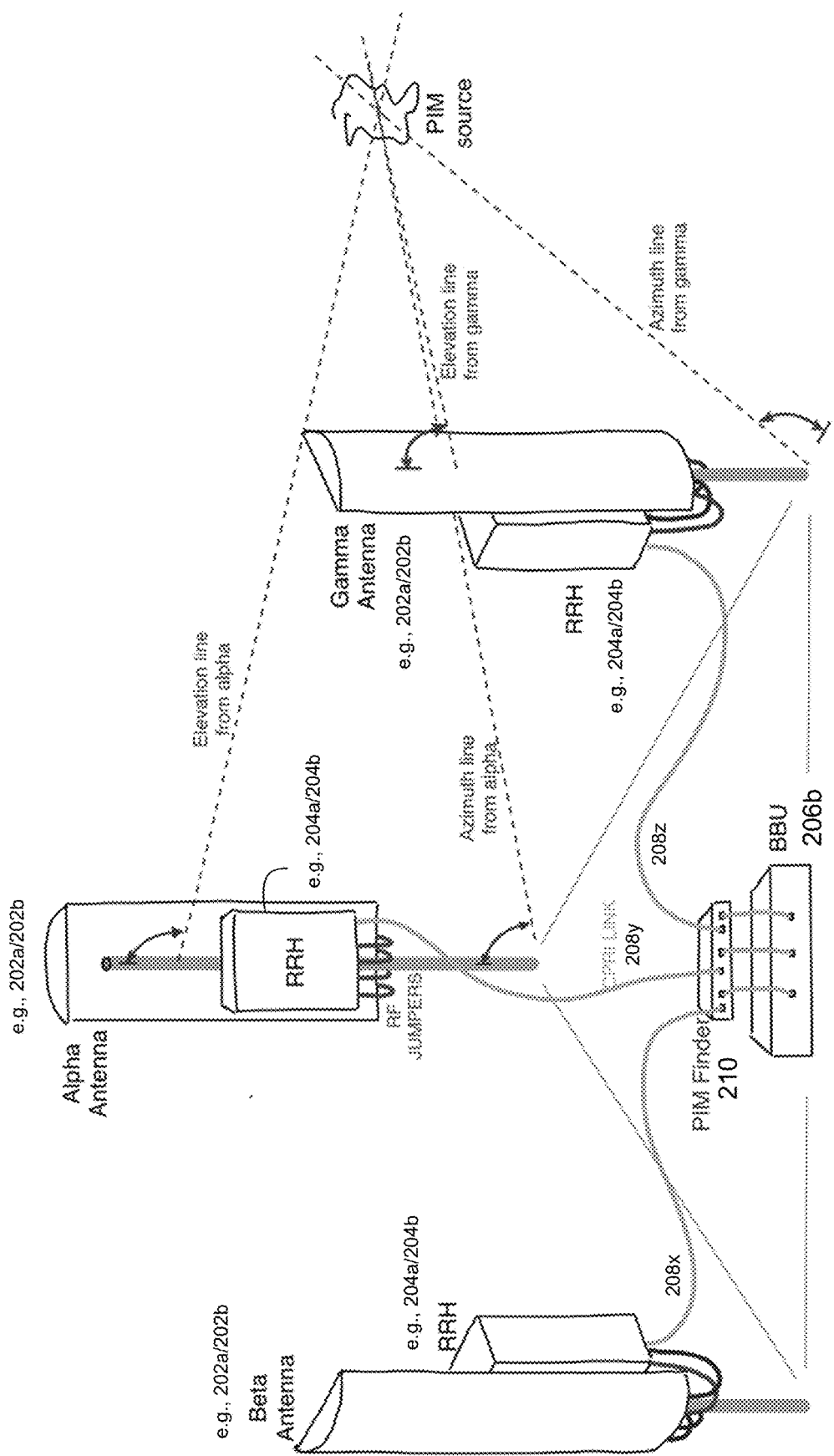
FIG. 2K shows an example base station site that is equipped with a 3-sector dual-band base station in accordance with various aspects described herein.
Figure 2L:
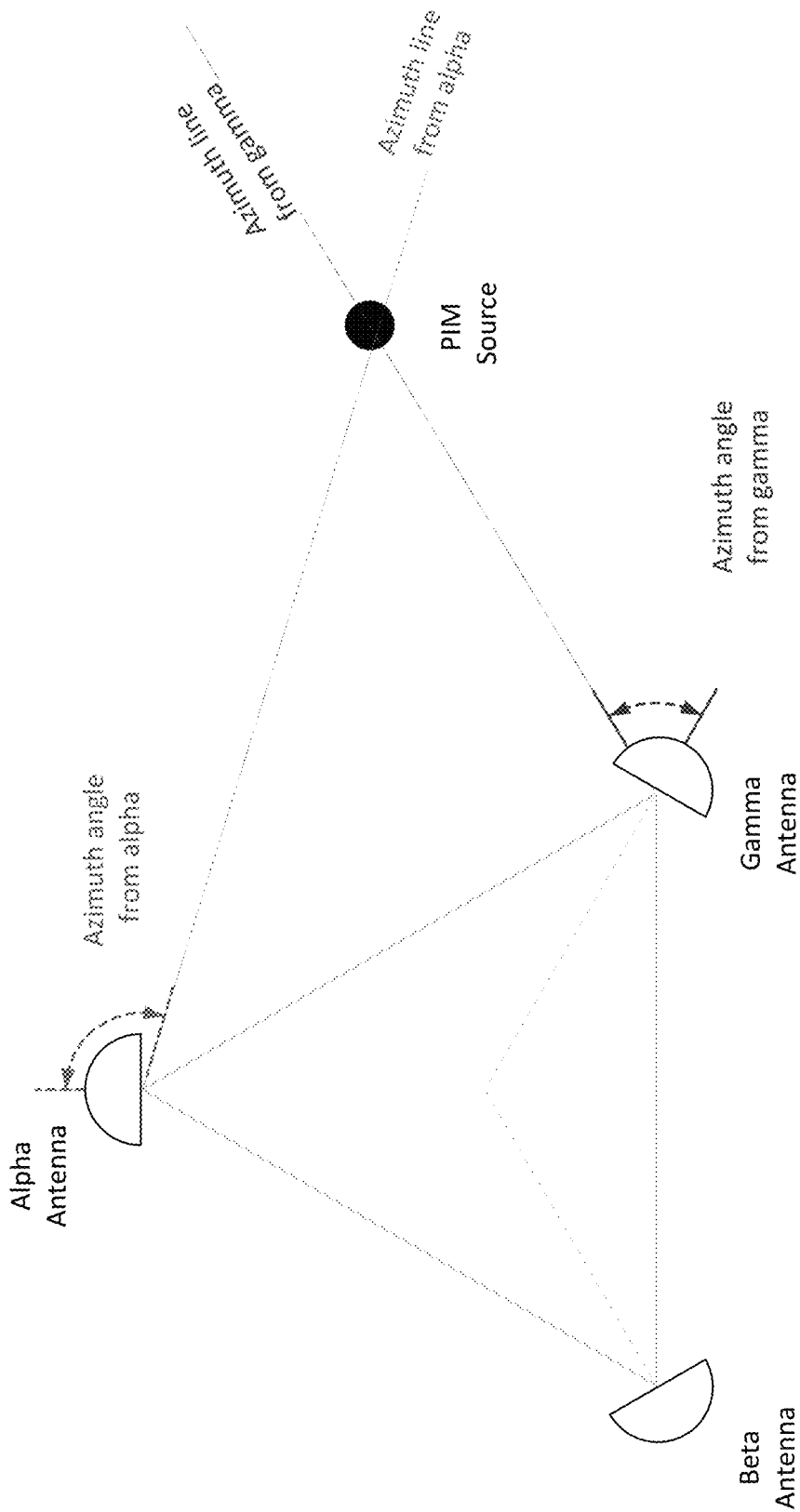
FIG. 2L shows a top-level view of the site of FIG. 2K, illustrating how the intersection of azimuth lines may be used to locate a PIM source in the azimuth direction.

Locating external PIM sources by means of computing the AoA of the RF wave generated by a PIM source, incident on an antenna array, may be applicable to both single sector base station sites and multi-sector base station sites. FIG. 2K shows an example base station site that is equipped with a 3-sector dual-band base station, with sectors named alpha, beta, and gamma. In this example, an external PIM source is located between the alpha and gamma sectors. Using signals from the alpha antenna, the azimuth and elevation angles of arrival may be computed. Likewise, the azimuth and elevation angles of arrival relative to the gamma antenna may also be computed. With knowledge of the relative physical locations of the antennas, an algorithm may be configured to locate the PIM source by finding the intersection of the lines generated from the azimuth and/or elevation angles measured at the alpha and gamma antennas. FIG. 2L shows a top-level view of the site of FIG. 2K, illustrating how the intersection of the azimuth lines may be used to locate the PIM source in the azimuth direction. Of course, the intersection of the elevation lines measured at the alpha and gamma antennas may be used to locate the PIM source in the elevation direction. While the locating of an external PIM source is shown in FIGS. 2K and 2L as involving azimuth and elevation angles of arrival pertaining to a single pair of the three antennas (alpha and gamma), it will be understood and appreciated that the locating of an external PIM source may alternatively involve azimuth and elevation angles of arrival pertaining to another pair of the three antennas (alpha and beta or beta and gamma). It will also be understood and appreciated that the locating of an external PIM source may further alternatively involve azimuth and elevation angles of arrival pertaining to all three antennas (alpha, beta, and gamma).

It is to be understood and appreciated that some or all of the various techniques described above may be combined to facilitate detecting, measuring, and/or locating of PIM sources. For instance, assume that, in the scenario shown in FIG. 2J, there is a $2^{nd}$ PIM source nearby that is not shown. Here, the PIM finder 210 may (e.g., based on detecting that there is not only the $1^{st}$ PIM source that is shown but also the $2^{nd}$ PIM source as well) apply beamforming and/or AoA to compute the estimated locations of the two PIM sources. Thereafter, the PIM finder 210 may discriminate between the two PIM sources by separately illuminating them (e.g., whether with linearly-polarized RF energy or otherwise, whether via one or more beams, whether via one or more beams that are pointed in different directions, whether via one or more beams that are rotated in polarization, or whether via just the +45° dipole(s) or just the −45° dipole(s)) to separately obtain their corresponding polarization measurements. This then allows the PIM finder 210 to hone in on the estimated aspect ratio/shape of each of the two PIM sources.

Figure 3A:
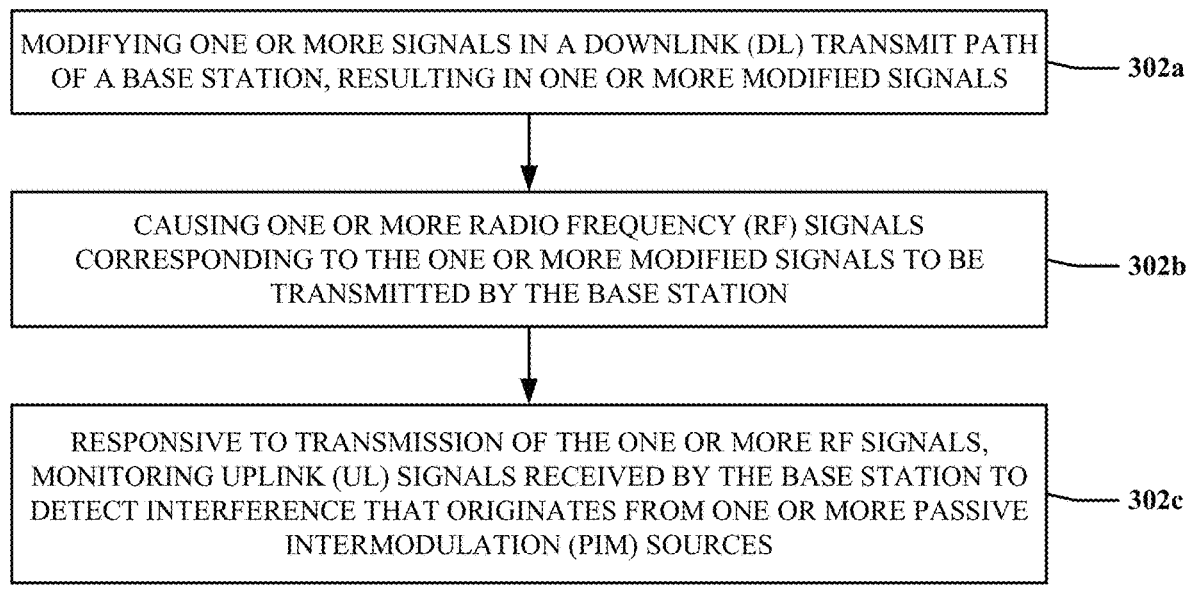
FIG. 3A depicts an illustrative embodiment of a method in accordance with various aspects described herein.

It is also to be understood and appreciated that, although one or more of FIGS. 2A to 2J might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, etc. may have been illustrated in one or more of FIGS. 2A to 2J as separate components, devices, systems, etc., it will be appreciated that multiple components, devices, systems, etc. can be implemented as a single component, device, system, etc., or a single component, device, system, etc. can be implemented as multiple components, devices, systems, etc. Additionally, functions described as being performed by one component, device, system, etc. may be performed by multiple components, devices, systems, etc., or functions described as being performed by multiple components, devices, systems, etc. may be performed by a single component, device, system, etc.

FIG. 3A depicts an illustrative embodiment of a method 300 in accordance with various aspects described herein.

At 302a, the method can include modifying one or more signals in a downlink (DL) transmit path of a base station, resulting in one or more modified signals. For example, similar to that described elsewhere herein, the PIM finder 210 may perform one or more operations that include modifying one or more signals in a downlink (DL) transmit path of a base station, resulting in one or more modified signals.

At 302b, the method can include causing one or more radio frequency (RF) signals corresponding to the one or more modified signals to be transmitted by the base station. For example, similar to that described elsewhere herein, the PIM finder 210 may perform one or more operations that include causing one or more radio frequency (RF) signals corresponding to the one or more modified signals to be transmitted via an antenna system.

At 302c, the method can include, responsive to transmission of the one or more RF signals, monitoring uplink (UL) signals received by the base station to detect interference that originates from one or more passive intermodulation (PIM) sources. For example, similar to that described elsewhere herein, the PIM finder 210 may perform one or more operations that include, responsive to transmission of the one or more RF signals, monitoring uplink (UL) signals received by the base station to detect interference that originates from one or more passive intermodulation (PIM) sources.

While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3B:
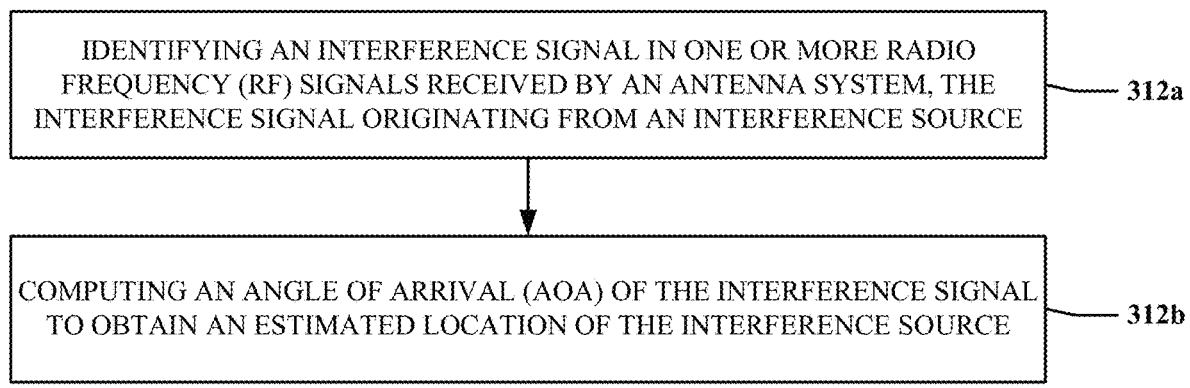
FIG. 3B depicts an illustrative embodiment of a method in accordance with various aspects described herein.

FIG. 3B depicts an illustrative embodiment of a method 310 in accordance with various aspects described herein.

At 312a, the method can include identifying an interference signal in one or more radio frequency (RF) signals received by an antenna system, the interference signal originating from an interference source. For example, similar to that described elsewhere herein, the PIM finder 210 may perform one or more operations that include identifying an interference signal in one or more radio frequency (RF) signals received by an antenna system, the interference signal originating from an interference source.

At 312b, the method can include computing an angle of arrival (AoA) of the interference signal to obtain an estimated location of the interference source. For example, similar to that described elsewhere herein, the PIM finder 210 may perform one or more operations that include computing an angle of arrival (AoA) of the interference signal to obtain an estimated location of the interference source.

While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3C:
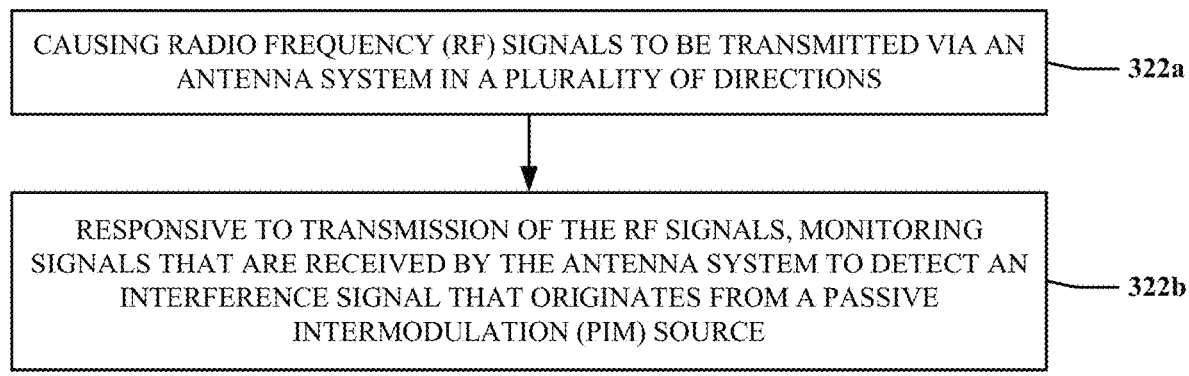
FIG. 3C depicts an illustrative embodiment of a method in accordance with various aspects described herein.

FIG. 3C depicts an illustrative embodiment of a method 320 in accordance with various aspects described herein.

At 322a, the method can include causing radio frequency (RF) signals to be transmitted via an antenna system in a plurality of directions. For example, similar to that described elsewhere herein, the PIM finder 210 may perform one or more operations that include causing radio frequency (RF) signals to be transmitted via an antenna system in a plurality of directions.

At 322b, the method can include, responsive to transmission of the RF signals, monitoring signals that are received by the antenna system to detect an interference signal that originates from a passive intermodulation (PIM) source. For example, similar to that described elsewhere herein, the PIM finder 210 may perform one or more operations that include, responsive to transmission of the RF signals, monitoring signals that are received by the antenna system to detect an interference signal that originates from a passive intermodulation (PIM) source.

While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3D:
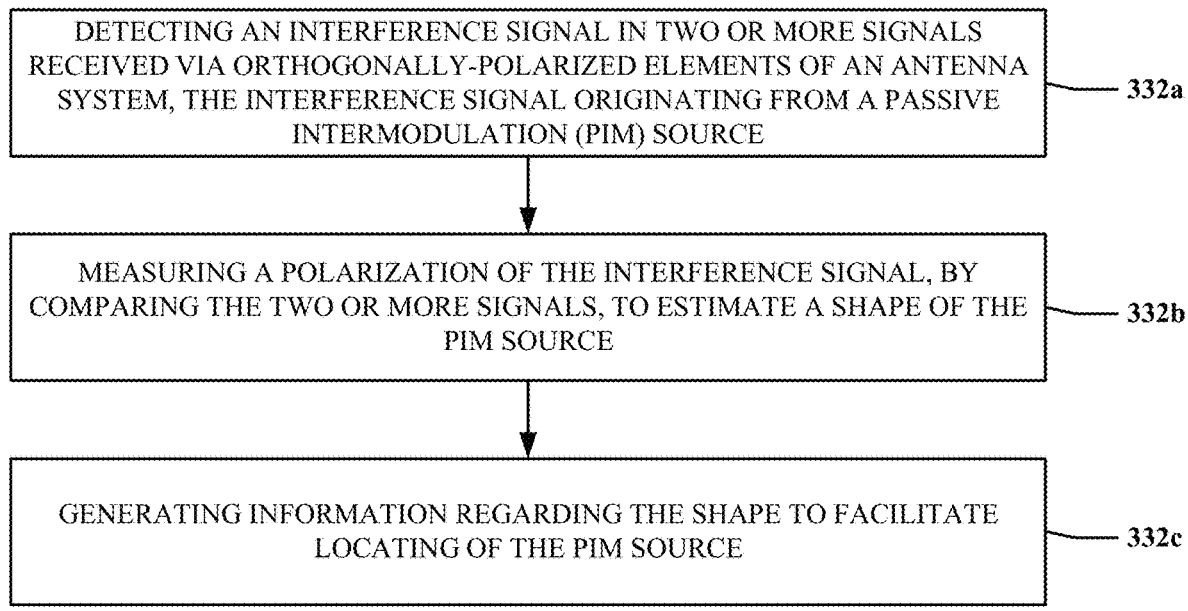
FIG. 3D depicts an illustrative embodiment of a method in accordance with various aspects described herein.

FIG. 3D depicts an illustrative embodiment of a method 330 in accordance with various aspects described herein.

At 332a, the method can include detecting an interference signal in two or more signals received via orthogonally-polarized elements of an antenna system, the interference signal originating from a passive intermodulation (PIM) source. For example, similar to that described elsewhere herein, the PIM finder 210 may perform one or more operations that include detecting an interference signal in two or more signals received via orthogonally-polarized elements of an antenna system, the interference signal originating from a passive intermodulation (PIM) source.

At 332b, the method can include measuring a polarization of the interference signal, by comparing the two or more signals, to estimate a shape of the PIM source. For example, similar to that described elsewhere herein, the PIM finder 210 may perform one or more operations that include measuring a polarization of the interference signal, by comparing the two or more signals, to estimate a shape of the PIM source.

At 332c, the method can include generating information regarding the shape to facilitate locating of the PIM source. For example, similar to that described elsewhere herein, the PIM finder 210 may perform one or more operations that include generating information regarding the shape to facilitate locating of the PIM source.

While for purposes of simplicity of explanation, the respective processes are shown and described as a series of blocks in FIG. 3D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3E:
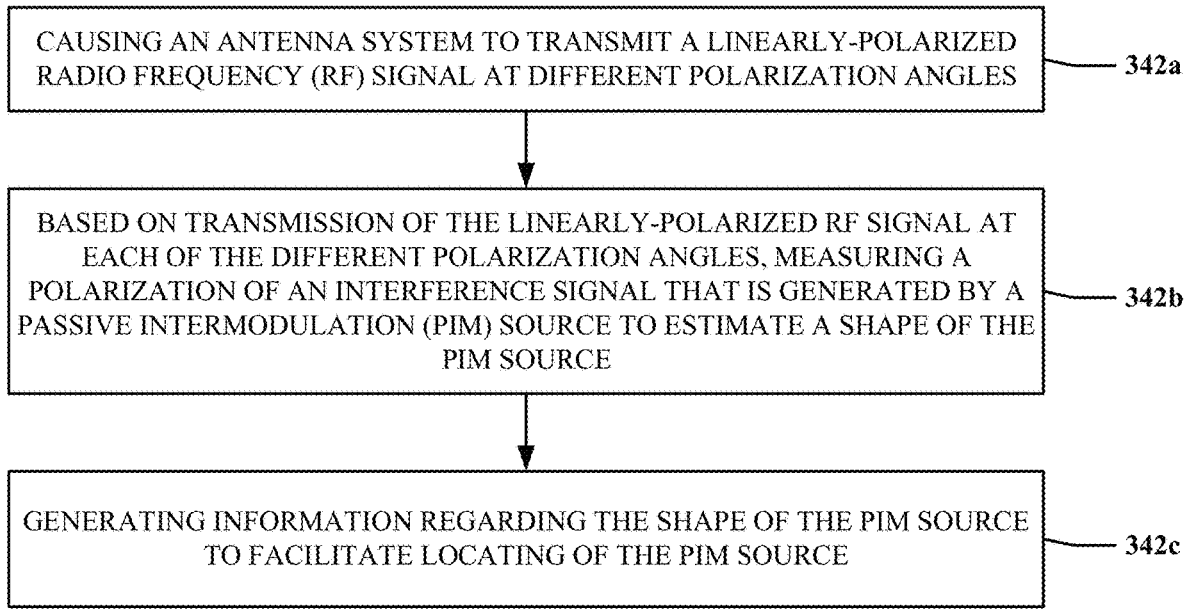
FIG. 3E depicts an illustrative embodiment of a method in accordance with various aspects described herein.

FIG. 3E depicts an illustrative embodiment of a method 340 in accordance with various aspects described herein.

At 342a, the method can include causing an antenna system to transmit a linearly-polarized radio frequency (RF) signal at different polarization angles. For example, similar to that described elsewhere herein, the PIM finder 210 may perform one or more operations that include causing an antenna system to transmit a linearly-polarized radio frequency (RF) signal at different polarization angles.

At 342b, the method can include, based on transmission of the linearly-polarized RF signal at each of the different polarization angles, measuring a polarization of an interference signal that is generated by a passive intermodulation (PIM) source to estimate a shape of the PIM source. For example, similar to that described elsewhere herein, the PIM finder 210 may perform one or more operations that include, based on transmission of the linearly-polarized RF signal at each of the different polarization angles, measuring a polarization of an interference signal that is generated by a passive intermodulation (PIM) source to estimate a shape of the PIM source.

At 342c, the method can include generating information regarding the shape of the PIM source to facilitate locating of the PIM source. For example, similar to that described elsewhere herein, the PIM finder 210 may perform one or more operations that include generating information regarding the shape of the PIM source to facilitate locating of the PIM source.

While for purposes of simplicity of explanation, the respective processes are shown and described as a series of blocks in FIG. 3E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a method comprises modifying one or more signals in a downlink (DL) transmit path of a base station, resulting in one or more modified signals, causing one or more radio frequency (RF) signals corresponding to the one or more modified signals to be transmitted by the base station, and responsive to transmission of the one or more RF signals, monitoring uplink (UL) signals received by the base station to detect interference that originates from one or more passive intermodulation (PIM) sources.

In one or more of these embodiments, the one or more signals comprise one or more data streams, the modifying comprises injecting particular data into the one or more data streams, and the particular data corresponds to one or more RF signals that facilitate detection of PIM, sources of PIM, or both.

In one or more of these embodiments, the causing involves signal amplification for facilitating illumination of the one or more PIM sources.

In one or more of these embodiments, the method further comprises based on the monitoring, determining a direction associated with the one or more PIM sources, performing one or more measurements relating to the one or more PIM sources, determining a location of the one or more PIM sources, or a combination thereof.

In one or more of these embodiments, the interference comprises internal PIM that is self-generated in the base station.

In one or more of these embodiments, the interference is external to the base station.

In one or more of these embodiments, the interference is generated by mixing of one or more DL signals transmitted by the base station.

In one or more of these embodiments, the interference is generated by mixing of one or more DL signals transmitted by different base stations and antenna systems.

In one or more of these embodiments, the method is implemented in a Common Public Radio Interface (CPRI) device, a baseband unit (BBU), a remote radio head (RRH) or remote radio unit (RRU), an RRH with integrated antenna, another device in a radio access network (RAN), or a combination thereof.

In various embodiments, a non-transitory machine-readable medium, comprises executable instructions that, when executed by a processing system including a processor, facilitate performance of operations. The operations comprise injecting data into one or more signals in a downlink (DL) transmit path of a base station, resulting in one or more modified signals, causing one or more radio frequency (RF) signals corresponding to the one or more modified signals to be transmitted by the base station, and responsive to transmission of the one or more RF signals, monitoring uplink (UL) signals received by the base station to detect passive intermodulation (PIM) interference.

In one or more of these embodiments, the one or more signals comprise one or more data streams.

In one or more of these embodiments, the data that is injected corresponds to one or more RF signals that facilitate detection of PIM, sources of PIM, or both.

In one or more of these embodiments, the causing involves signal amplification for facilitating illumination of one or more PIM sources.

In one or more of these embodiments, the PIM interference is self-generated in the base station.

In one or more of these embodiments, the PIM interference is external to the base station.

In various embodiments, a device comprises a processing system including a processor, and a memory that stores executable instructions that, when executed by the processing system, facilitate performance of operations. The operations comprise modifying one or more signals in a downlink (DL) transmit path of a base station, resulting in one or more modified signals, causing one or more radio frequency (RF) signals corresponding to the one or more modified signals to be transmitted by the base station, and responsive to transmission of the one or more RF signals, detecting an interference signal in one or more uplink (UL) signals received by the base station, the interference signal originating from a passive intermodulation (PIM) source.

In one or more of these embodiments, the operations further comprise, based on the detecting, determining a direction associated with the PIM source, performing one or more measurements relating to the PIM source, determining a location of the PIM source, or a combination thereof.

In one or more of these embodiments, the interference signal is generated by mixing of one or more DL signals transmitted by the base station.

In one or more of these embodiments, the interference signal is generated by mixing of one or more DL signals transmitted by different base stations and antenna systems.

In one or more of these embodiments, the device is a Common Public Radio Interface (CPRI) device, a baseband unit (BBU), a remote radio head (RRH) or remote radio unit (RRU), an RRH with integrated antenna, another device in a radio access network (RAN), or a combination thereof.

In various embodiments, a method comprises identifying an interference signal in one or more radio frequency (RF) signals received by an antenna system, the interference signal originating from an interference source, and computing an angle of arrival (AoA) of the interference signal to obtain an estimated location of the interference source.

In one or more of these embodiments, the identifying involves analyzing the one or more RF signals to derive an azimuth angle for the interference signal and an elevation angle for the interference signal.

In one or more of these embodiments, the computing involves computing a time difference or a phase difference between RF signals that are received by different antenna elements of the antenna system.

In one or more of these embodiments, the antenna system comprises a multiple-input multiple-output (MIMO) antenna or a massive MIMO antenna.

In one or more of these embodiments, the antenna system comprises an antenna array that is associated with a base station.

In one or more of these embodiments, the antenna system comprises a plurality of antenna arrays that are associated with a plurality of base stations.

In one or more of these embodiments, the interference signal is generated by mixing of one or more RF signals transmitted by the antenna system.

In one or more of these embodiments, the interference signal results from illumination of a passive intermodulation (PIM) source by one or more RF signals transmitted by the antenna system.

In one or more of these embodiments, the interference signal results from illumination of a passive intermodulation (PIM) source by one or more RF signals transmitted by a different antenna system.

In one or more of these embodiments, the method is implemented in a Common Public Radio Interface (CPRI) device, a baseband unit (BBU), a remote radio head (RRH) or remote radio unit (RRU), an RRH with integrated antenna, another device in a radio access network (RAN), or a combination thereof.

In various embodiments, a non-transitory machine-readable medium comprises executable instructions that, when executed by a processing system including a processor, facilitate performance of operations. The operations comprise identifying an interference signal in one or more radio frequency (RF) signals received by an antenna system, and computing an angle of arrival (AoA) of the interference signal to obtain an estimated location of an interference source.

In one or more of these embodiments, the identifying involves analyzing the one or more RF signals to derive an azimuth angle for the interference signal and an elevation angle for the interference signal.

In one or more of these embodiments, the computing involves computing a time difference or a phase difference between RF signals that are received by different antenna elements of the antenna system.

In one or more of these embodiments, the antenna system comprises a multiple-input multiple-output (MIMO) antenna or a massive MIMO antenna.

In one or more of these embodiments, the antenna system comprises an antenna array that is associated with a base station.

In various embodiments, a device comprises a processing system including a processor, and a memory that stores executable instructions that, when executed by the processing system, facilitate performance of operations. The operations comprise computing a first azimuth angle of arrival (AoA) and a first elevation AoA of an interference signal received by a first antenna of a multi-sector base station, computing a second azimuth AoA and a second elevation AoA of the interference signal received by a second antenna of the multi-sector base station, and estimating a location of a source of the interference signal (i) by determining an intersection of lines corresponding to the first azimuth AoA and the second azimuth AoA, (ii) by determining an intersection of lines corresponding to the first elevation AoA and the second elevation AoA, or both (i) and (ii).

In one or more of these embodiments, the estimating is based on known relative locations of the first antenna and the second antenna.

In one or more of these embodiments, the source of the interference signal is an external passive intermodulation (PIM) source.

In one or more of these embodiments, the device is a Common Public Radio Interface (CPRI) device, a baseband unit (BBU), a remote radio head (RRH) or remote radio unit (RRU), an RRH with integrated antenna, another device in a radio access network (RAN), or a combination thereof.

In one or more of these embodiments, the interference signal results from illumination of the source of the interference signal by one or more RF signals transmitted by an antenna of the multi-sector base station or by an antenna that is not part of the multi-sector base station.

In various embodiments, a method comprises causing radio frequency (RF) signals to be transmitted via an antenna system in a plurality of directions, and responsive to transmission of the RF signals, monitoring signals that are received by the antenna system to detect an interference signal that originates from a passive intermodulation (PIM) source.

In one or more of these embodiments, the plurality of directions corresponds to different azimuth angles and different elevation angles relative to the antenna system.

In one or more of these embodiments, the causing involves forming corresponding beams for the RF signals.

In one or more of these embodiments, the causing involves steering of the corresponding beams to the plurality of directions.

In one or more of these embodiments, the steering involves changes in an azimuth direction via introduction of phase shifts or time delays between signals associated with different elements of the antenna system, changes in an elevation direction via control of a remote electronic tilt (RET) system, or a combination thereof.

In one or more of these embodiments, the steering involves changes in an azimuth direction or an elevation direction via introduction of phase shifts or time delays between signals associated with different elements of the antenna system.

In one or more of these embodiments, the corresponding beams are transmitted substantially simultaneously in the plurality of directions.

In one or more of these embodiments, the method further comprises estimating a location of the PIM source based on identifying a transmitted beam that corresponds to a peak energy of the interference signal.

In one or more of these embodiments, the method further comprises estimating a location of the PIM source based on the monitoring.

In one or more of these embodiments, the monitoring comprises measuring energy levels associated with the interference signal.

In one or more of these embodiments, the interference signal results from illumination of the PIM source by the RF signals transmitted via the antenna system.

In one or more of these embodiments, the interference signal results from illumination of the PIM source by RF signals transmitted by a different antenna system.

In various embodiments, a non-transitory machine-readable medium comprises executable instructions that, when executed by a processing system including a processor, facilitate performance of operations. The operations comprise causing radio frequency (RF) signals to be transmitted via an antenna system in a plurality of directions, and responsive to transmission of the RF signals, monitoring signals that are received via the antenna system to locate a passive intermodulation (PIM) source.

In one or more of these embodiments, the plurality of directions corresponds to different azimuth angles and different elevation angles relative to the antenna system.

In one or more of these embodiments, the causing involves forming corresponding beams for the RF signals.

In one or more of these embodiments, the causing involves steering of the corresponding beams to the plurality of directions.

In one or more of these embodiments, the corresponding beams are transmitted substantially simultaneously in the plurality of directions.

In various embodiments, a device comprises a processing system including a processor, and a memory that stores executable instructions that, when executed by the processing system, facilitate performance of operations. The operations comprise causing an antenna system to beam steer at least one transmit signal, resulting in a plurality of transmit beams, during the causing, monitoring signals that are received by the antenna system to detect an interference signal that originates from a passive intermodulation (PIM) source, and based on the monitoring, identifying a beam of the plurality of transmit beams that corresponds to peaking of the interference signal, thereby enabling a direction of the PIM source to be determined.

In one or more of these embodiments, the direction comprises an azimuth angle, an elevation angle, or both that facilitate a location of the PIM source to be identified.

In one or more of these embodiments, the device is a Common Public Radio Interface (CPRI) device, a baseband unit (BBU), a remote radio head (RRH) or remote radio unit (RRU), an RRH with integrated antenna, another device in a radio access network (RAN), or a combination thereof.

In various embodiments, a method comprises detecting an interference signal in two or more signals received via orthogonally-polarized elements of an antenna system, the interference signal originating from a passive intermodulation (PIM) source, measuring a polarization of the interference signal, to by comparing the two or more signals, to estimate a shape of the PIM source, and generating information regarding the shape to facilitate locating of the PIM source.

In one or more of these embodiments, the information identifies an aspect ratio of the PIM source.

In one or more of these embodiments, the antenna system comprises additional orthogonally-polarized elements.

In one or more of these embodiments, the method further comprises performing a comparison of the two or more signals received by the orthogonally-polarized elements with two or more other signals received by the additional orthogonally-polarized elements, and estimating a location of the PIM source based on the comparison.

In one or more of these embodiments, the antenna system comprises an antenna array that is associated with a base station.

In one or more of these embodiments, the antenna system comprises a plurality of antenna arrays that are associated with a plurality of base stations.

In one or more of these embodiments, the interference signal is generated by mixing of one or more signals transmitted via the antenna system.

In one or more of these embodiments, the interference signal results from illumination of the PIM source by one or more radio frequency (RF) signals transmitted by the antenna system.

In one or more of these embodiments, the interference signal results from illumination of the PIM source by one or more radio frequency (RF) signals transmitted by a different antenna system.

In one or more of these embodiments, the method is implemented in a Common Public Radio Interface (CPRI) device, a baseband unit (BBU), a remote radio head (RRH) or remote radio unit (RRU), an RRH with integrated antenna, another device in a radio access network (RAN), or a combination thereof.

In one or more of these embodiments, the antenna system comprises a multiple-input multiple-output (MIMO) antenna or a massive MIMO antenna.

In various embodiments, a non-transitory machine-readable medium comprises executable instructions that, when executed by a processing system including a processor, facilitate performance of operations. The operations comprise causing an antenna system to transmit a linearly-polarized radio frequency (RF) signal at different polarization angles, based on transmission of the linearly-polarized RF signal at each of the different polarization angles, measuring a polarization of an interference signal that is generated by a passive intermodulation (PIM) source to estimate a shape of the PIM source, and generating information regarding the shape of the PIM source to facilitate locating of the PIM source.

In one or more of these embodiments, the causing involves adjusting a polarization angle of the linearly-polarized RF signal to be transmitted so as to facilitate identification of a polarization of the interference signal.

In one or more of these embodiments, the causing involves substantially simultaneous transmission of the linearly-polarized RF signal at the different polarization angles so as to facilitate identification of a polarization of the interference signal.

In one or more of these embodiments, the causing involves injecting, into one or more base station downlink (DL) data streams, particular data that corresponds to adjustments of the linearly-polarized RF signal to the different polarization angles.

In one or more of these embodiments, the information identifies an aspect ratio of the PIM source.

In one or more of these embodiments, the processing system is implemented in a Common Public Radio Interface (CPRI) device, a baseband unit (BBU), a remote radio head (RRH) or remote radio unit (RRU), an RRH with integrated antenna, another device in a radio access network (RAN), or a combination thereof.

In one or more of these embodiments, the causing involves beamforming for the linearly-polarized RF signal at the different polarization angles.

In various embodiments, a device comprises a processing system including a processor, and a memory that stores executable instructions that, when executed by the processing system, facilitate performance of operations. The operations comprise detecting a passive intermodulation (PIM) signal in two or more signals received via an antenna system, determining a polarization of the PIM signal, by comparing the two or more signals, to estimate a shape of a corresponding PIM source, and generating information regarding the shape to facilitate locating of the PIM source.

In one or more of these embodiments, the information identifies an aspect ratio of the PIM source.

Figure 4:
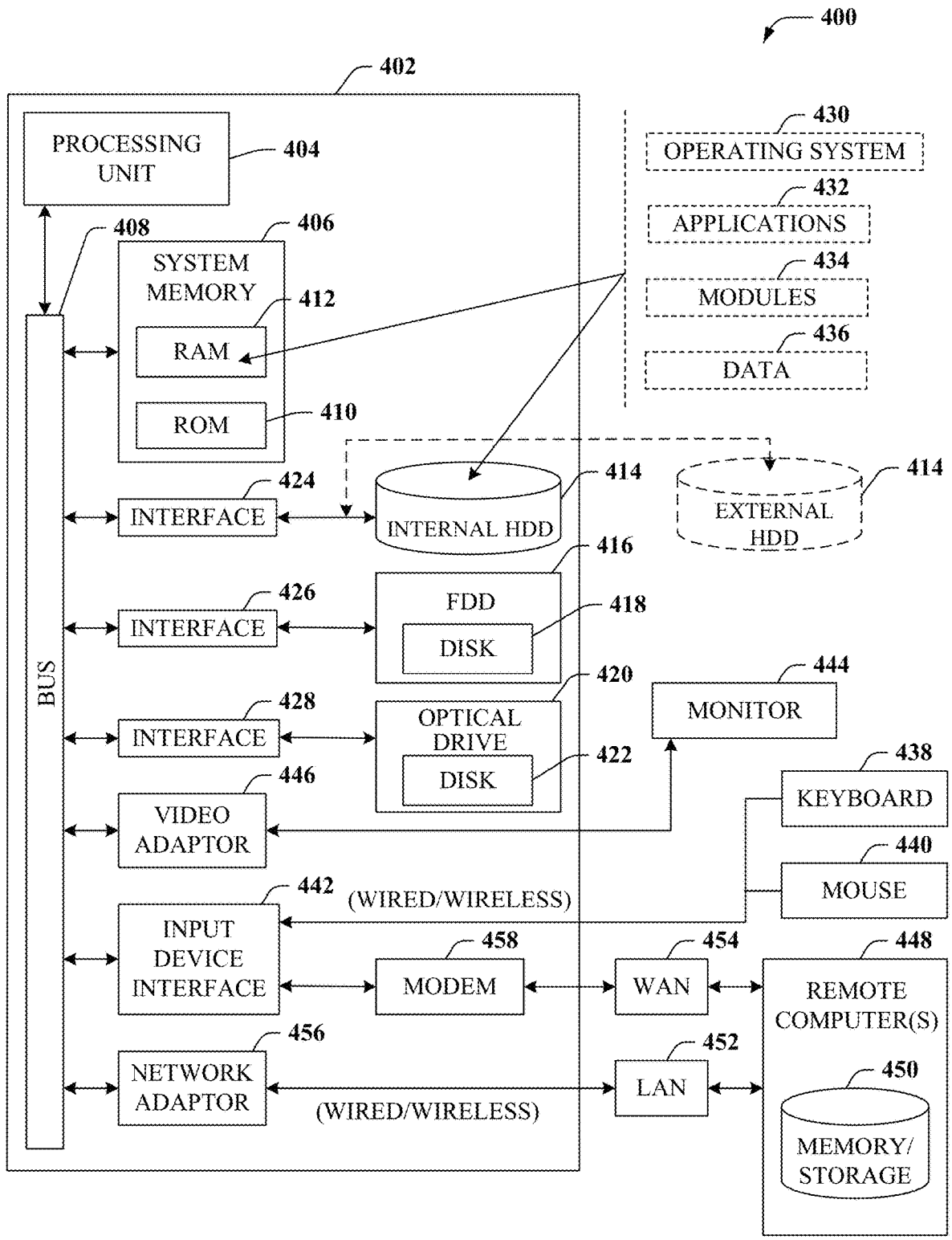
FIG. 4 is a block diagram of an example, non-limiting embodiment of a computing environment in accordance with various aspects described herein.

Turning now to FIG. 4, there is illustrated a block diagram of a computing environment in accordance with various aspects described herein. To provide additional context for various embodiments of the embodiments described herein, FIG. 4 and the following discussion are intended to provide a brief, general description of a suitable computing environment 1300 in which the various embodiments of the subject disclosure can be implemented. In particular, computing environment 1300 can be used in the implementation of network elements 150, 152, 154, 156, access terminal 112, base station or access point 122, switching device 132, media terminal 142, one or more (or a combination) of control and monitoring/detection units, component(s) of one or more of the systems of FIGS. 2A, 2B, 2D, and/or 2F, etc. Each of these devices can be implemented via computer-executable instructions that can run on one or more computers, and/or in combination with other program modules and/or as a combination of hardware and software. For example, computing environment 400 can facilitate, in whole or in part, detecting, measuring, and/or locating PIM sources.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a nonvolatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual-band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, which may be used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, nonvolatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. One or more embodiments can employ various AI-based schemes for carrying out various embodiments thereof. Moreover, a classifier can be employed. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to, training data. Other directed and undirected model classification approaches comprise, e.g., naïve Bayes, Bayesian networks, decision trees, neural networks, fuzzy logic models, and probabilistic classification models providing different patterns of independence. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

The foregoing embodiments can be combined in whole or in part with the embodiments described in any of U.S. patent application Ser. No. 17/407,241 filed on Aug. 20, 2021 and entitled "METHOD AND SYSTEM FOR MITIGATING INTERFERENCE BY ROTATING ANTENNA STRUCTURES (which published as U.S. Patent Publication No. 2022/0069855 on Mar. 3, 2022), U.S. patent application Ser. No. 17/709,724 filed on Mar. 31, 2022 and entitled "POLARIZATION SHIFTING DEVICES AND SYSTEMS FOR INTERFERENCE MITIGATION" (which issued as U.S. Pat. No. 11,476,585 on Oct. 18, 2022), U.S. patent application Ser. No. 17/825,565 filed on May 26, 2022 and entitled "DUAL SHIFTER DEVICES AND SYSTEMS FOR POLARIZATION ROTATION TO MITIGATE INTERFERENCE" (which issued as U.S. Pat. No. 11,515,652 on Nov. 29, 2022), and U.S. patent application Ser. No. 18/315,979 filed on May 11, 2023 and entitled "METHOD AND SYSTEM FOR IMPROVING MULTIPLE-INPUT-MULTIPLE-OUTPUT (MIMO) BEAM ISOLATION VIA ALTERNATING POLARIZATION." For instance, embodiments of one or more of the aforementioned U.S. publication(s)/application(s)/patent(s) can be combined in whole or in part with embodiments of the subject disclosure. For example, one or more features and/or embodiments described in one or more of the aforementioned U.S. publication(s)/application(s)/patent(s) can be used in conjunction with (or as a substitute for) one or more features and/or embodiments described herein, and vice versa. Accordingly, all sections of the aforementioned U.S. publication(s)/application(s)/patent(s) are incorporated herein by reference in their entirety.

What is claimed is:

1. A method, comprising:
   modifying one or more signals in a downlink (DL) transmit path of a base station, resulting in one or more modified signals, wherein the one or more signals comprise one or more data streams, and wherein the modifying the one or more signals comprises injecting selected data into the one or more data streams;
   causing one or more radio frequency (RF) signals corresponding to the one or more modified signals to be transmitted by the base station, wherein the causing comprises converting the one or more data streams to transmission radio frequency (RF) signals and amplifying the transmission RF signals for simultaneous transmission by one or more antennas in a plurality of directions; and
   responsive to transmission of the one or more RF signals, monitoring uplink (UL) signals received by the base station to detect interference that originates from one or more passive intermodulation (PIM) sources;
   determining an azimuth or an elevation angle, or both, of the uplink signals received by the base station due to the interference that originates from the one or more PIM sources; and
   estimating a physical location of the one or more PIM sources based on the azimuth or elevation angle, or both, of the uplink signals received by the base station.

2. The method of claim 1, wherein the selected data corresponds to one or more RF signals, the one or more RF signals corresponding to carrier wave (CW) signals, wideband signals, or other signals selected to facilitate detection of PIM, sources of PIM, or both.

3. The method of claim 1, wherein the causing involves signal amplification for facilitating illumination of the one or more PIM sources.

4. The method of claim 1, further comprising, based on the monitoring, determining a direction associated with the one or more PIM sources, performing one or more measurements relating to the one or more PTM sources, determining the physical location of the one or more PIM sources, or a combination thereof.

5. The method of claim 1, wherein the interference comprises internal PIM that is self-generated in the base station.

6. The method of claim 1, wherein the interference is external to the base station.

7. The method of claim 1, wherein the interference is generated by mixing of one or more DL signals transmitted by the base station.

8. The method of claim 1, wherein the interference is generated by mixing of one or more DL signals transmitted by different base stations and antenna systems.

9. The method of claim 1, wherein the method is implemented in a Common Public Radio Interface (CPRI) device, a baseband unit (BBU), a remote radio head (RRH) or remote radio unit (RRU), an RRH with integrated antenna, another device in a radio access network (RAN), or a combination thereof.

10. A non-transitory machine-readable medium, comprising executable instructions that, when executed by a processing system including a processor, facilitate performance of operations, the operations comprising:
    injecting data into one or more signals in a downlink (DL) transmit path of a base station, resulting in one or more modified signals, wherein the injecting data comprises injecting selected data into one or more data streams in the DL transmit path of the base station;
    causing one or more radio frequency (RF) signals corresponding to the one or more modified signals to be transmitted by the base station, wherein the causing comprises converting the one or more data streams to transmission radio frequency (RF) signals and amplifying the transmission RF signals for simultaneous transmission by one or more antennas in a plurality of directions;
    responsive to transmission of the one or more RF signals, monitoring uplink (UL) signals received by the base station to detect passive intermodulation (PIM) interference;
    determining an azimuth or elevation angle, or both, of the uplink signals received by the base station due to the PIM interference; and
    estimating location of sources of the PIM interference based on the azimuth or elevation angle.

11. The non-transitory machine-readable medium of claim 10, wherein the one or more signals comprise one or more data streams.

12. The non-transitory machine-readable medium of claim 11, wherein the data that is injected corresponds to one or more RF signals that facilitate detection of PIM, sources of PIM, or both.

13. The non-transitory machine-readable medium of claim 10, wherein the causing involves signal amplification for facilitating illumination of one or more PIM sources.

14. The non-transitory machine-readable medium of claim 10, wherein the PIM interference is self-generated in the base station.

15. The non-transitory machine-readable medium of claim 10, wherein the PIM interference is external to the base station.

16. A device, comprising:
    a processing system including a processor; and
    a memory that stores executable instructions that, when executed by the processing system, facilitate performance of operations, the operations comprising:
    modifying one or more signals in a downlink (DL) transmit path of a base station, resulting in one or more modified signals, wherein the one or more signals comprise one or more data streams, and wherein the modifying the one or more signals comprises injecting selected data into the one or more data streams;
    causing one or more radio frequency (RF) signals corresponding to the one or more modified signals to be transmitted by the base station, wherein the causing comprises converting the one or more data streams to transmission radio frequency (RF) signals and amplifying the transmission RF signals for transmission by one or more antennas in a plurality of directions;

responsive to transmission of the one or more RF signals, detecting an interference signal in one or more uplink (UL) signals received by the base station, the interference signal originating from a passive intermodulation (PIM) source;

detecting an azimuth or an elevation angle of the interference signal that originates from the PIM source; and estimation a location of the PIM source responsive to the azimuth or the elevation angle of the interference signal.

17. The device of claim 16, wherein the operations further comprise, based on the detecting, determining a direction associated with the PIM source, performing one or more measurements relating to the PIM source, determining the location of the PIM source, or a combination thereof.

18. The device of claim 16, wherein the interference signal is generated by mixing of one or more DL signals transmitted by the base station.

19. The device of claim 16, wherein the interference signal is generated by mixing of one or more DL signals transmitted by different base stations and antenna systems.

20. The device of claim 16, wherein the device is a Common Public Radio Interface (CPRI) device, a baseband unit (BBU), a remote radio head (RRH) or remote radio unit (RRU), an RRH with integrated antenna, another device in a radio access network (RAN), or a combination thereof.

* * * * *

UNITED STATES PATENT AND TRADEMARK OFFICE
CERTIFICATE OF CORRECTION

| | | |
|---|---|---|
| PATENT NO. | : 12,301,315 B1 | Page 1 of 1 |
| APPLICATION NO. | : 18/631330 | |
| DATED | : May 13, 2025 | |
| INVENTOR(S) | : Pablo Tacconi | |

It is certified that error appears in the above-identified patent and that said Letters Patent is hereby corrected as shown below:

In the Claims

In Column 31, Claim 4, Line 57, "PTM" should be "PIM"

Signed and Sealed this
Twenty-third Day of December, 2025

John A. Squires
*Director of the United States Patent and Trademark Office*